US012739929B2

(12) United States Patent
Gu et al.

(10) Patent No.: US 12,739,929 B2
(45) Date of Patent: Sep. 15, 2026

(54) ELECTRONIC DEVICE AND ANTENNA CONTROL METHOD FOR ELECTRONIC DEVICE

(71) Applicant: Samsung Electronics Co., Ltd., Suwon-si (KR)

(72) Inventors: Jaheon Gu, Suwon-si (KR); Mincheol Seo, Suwon-si (KR); Bokun Choi, Suwon-si (KR); Moonsoo Kim, Suwon-si (KR); Youngkow Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 808 days.

(21) Appl. No.: 17/984,795

(22) Filed: Nov. 10, 2022

(65) Prior Publication Data

US 2023/0076696 A1 Mar. 9, 2023

Related U.S. Application Data

(63) Continuation of application No. PCT/KR2021/005342, filed on Apr. 28, 2021.

(30) Foreign Application Priority Data

May 14, 2020 (KR) ........................ 10-2020-0057601

(51) Int. Cl.
*H04W 76/25* (2018.01)
*H04B 1/16* (2006.01)
*H04W 36/06* (2009.01)

(52) U.S. Cl.
CPC .......... *H04W 76/25* (2018.02); *H04W 36/06* (2013.01); *H04B 1/16* (2013.01)

(58) Field of Classification Search
CPC ...... H04W 76/25; H04W 36/06; Y02D 30/70; H01Q 5/328; H01Q 5/335; H01Q 9/0421;
(Continued)

(56) References Cited

U.S. PATENT DOCUMENTS 7,047,006 B2 5/2006 Classon et al.
7,251,459 B2 7/2007 McFarland et al.
(Continued)

FOREIGN PATENT DOCUMENTS

CN 1926842 A 3/2007
CN 109981130 A 7/2019
(Continued)

OTHER PUBLICATIONS

Chinese Office Action with English translation dated Apr. 12, 2025; Chinese Appln. No. 202180036510.2.
(Continued)

*Primary Examiner* — Oussama Roudani
(74) *Attorney, Agent, or Firm* — Jefferson IP Law, LLP

(57) ABSTRACT

An electronic device is provided. The electronic device includes a communication circuit including at least one antenna, a memory, and a processor operatively connected with the communication circuit and the memory. The memory includes instructions, when executed, causing the processor to identify a communication state of the communication circuit, adjust a characteristic of the antenna to a wideband characteristic including a first wireless-fidelity (Wi-Fi) band and a second Wi-Fi band by means of the communication circuit to scan a Wi-Fi communication channel, when the identified communication state is a state where the Wi-Fi communication channel is scanned, and adjust the characteristic of the antenna to a narrowband characteristic corresponding to a determined communication channel to perform Wi-Fi communication, when the identified commu-
(Continued)

START
IDENTIFY NETWORK CONNECTION STATE 910
IS THERE NEED TO SCAN COMMUNICATION CHANNEL? 920
Yes
No
930 CONTROL SWITCH CONNECTED WITH ANTENNA TO ADJUST CHARACTERISTIC OF ANTENNA TO WIDEBAND CHARACTERISTIC
950 CONTROL SWITCH CONNECTED WITH ANTENNA TO ADJUST CHARACTERISTIC OF ANTENNA TO NARROWBAND CHARACTERISTIC
940 PERFORM SCAN OPERATION OF SEARCHING FOR EXTERNAL ELECTROIC DEVICE, USING ANTENNA, CHARACTERISTIC OF WHICH IS ADJUSTED
960 PERFORM COMMUNICATION OVER DETERMINED COMMUNICATION CHANNEL, USING ANTENNA, CHARACTERISTIC OF WHICH IS ADJUSTED
END nication state is a state where the Wi-Fi communication channel to communicate is determined.

20 Claims, 18 Drawing Sheets

(58) Field of Classification Search
CPC .......... H01Q 5/25; H04B 1/005; H04B 1/401; H04B 1/0064
See application file for complete search history.

(56) References Cited

U.S. PATENT DOCUMENTS

| | | | |
|---|---|---|---|
| 7,610,070 | B2 | 10/2009 | Schmidt |
| 7,865,150 | B2 | 1/2011 | McFarland et al. |
| 7,924,226 | B2 | 4/2011 | Soler Castany et al. |
| 9,014,232 | B2 | 4/2015 | Mahonen et al. |
| 9,066,265 | B2 | 6/2015 | Park et al. |
| 9,125,158 | B2 * | 9/2015 | Ly-Gagnon ....... H04W 52/0225 |
| 10,354,103 | B2 | 7/2019 | Raptis et al. |
| 10,817,680 | B2 | 10/2020 | Raptis et al. |
| 2003/0219035 | A1 | 11/2003 | Schmidt |
| 2005/0245258 | A1 | 11/2005 | Classon et al. |
| 2007/0225034 | A1 * | 9/2007 | Schmidt ................. H01Q 1/241 455/552.1 |
| 2007/0290944 | A1 * | 12/2007 | Takaki ..................... H01Q 9/42 343/900 |
| 2010/0087146 | A1 | 4/2010 | Han et al. |
| 2010/0089619 | A1 * | 4/2010 | Chen .................... H05K 9/0028 29/829 |
| 2013/0016633 | A1 * | 1/2013 | Lum ........................ H04B 1/16 370/297 |
| 2013/0337806 | A1 | 12/2013 | Barash et al. |
| 2019/0141620 | A1 * | 5/2019 | Pujari ................... H04W 48/16 |
| 2019/0191472 | A1 | 6/2019 | Nam et al. |
| 2019/0372200 | A1 | 12/2019 | Sharawi et al. |
| 2021/0072373 | A1 * | 3/2021 | Schoenberg .......... G01S 13/878 |

FOREIGN PATENT DOCUMENTS

| | | | |
|---|---|---|---|
| EP | 1 750 467 | A1 | 2/2007 |
| KR | 10-2010-0018371 | A | 2/2010 |
| KR | 10-2010-0038790 | A | 4/2010 |
| KR | 10-1127344 | B1 | 4/2012 |
| KR | 10-1730207 | B1 | 4/2017 |

OTHER PUBLICATIONS

Indian Hearing Notice dated Sep. 2, 2024; Indian Appln. No. 202217067012.

Rodrigo, ‘Reconfigurable, Pixel Antennas for Communications’, Universitat Politecnica de Catalunya, Apr. 2013.

Rahman et. al., Bandwidth Enhancement and Frequency Scanning Array Antenna Using Novel UWB Filter Integration Technique for OFDM UWB Radar Applications in Wireless Vital Signs Monitoring, Sensors 2018, 18, 3155; doi:10.3390/s18093155; Sep. 19, 2018.

OFCOM, ‘Improving spectrum access for Wi-Fi, Spectrum use in the 5 and 6 GHz bands’, Jan. 17, 2020.

Augustin et al.; Diversity Antenna with Electronically Switchable Wide/Narrow band for Cognitive Radio Systems; The 8th European Conference on Antennas and Propagation (EuCAP 2014); IEEE; Apr. 6, 2014; XP32643013.

European Search Report dated Sep. 26, 2023; European Appln. No. 21803249.8-1206 / 4145709 PCT/KR2021005342.

Extended European Search Report dated Jan. 4, 2024; European Appln. No. 21803249.8-1206 / 4145709 PCT/KR2021005342.

Korean Office Action with English translation dated Jan. 8, 2024; Korean Appln. No. 10-2020-0057601.

Indian Office Action dated Jan. 9, 2024; Indian Appln. No. 202217067012.

* cited by examiner

ELECTRONIC DEVICE AND ANTENNA CONTROL METHOD FOR ELECTRONIC DEVICE

CROSS-REFERENCE TO RELATED APPLICATION(S)

This application is a continuation application, claiming priority under § 365(c), of an International application No. PCT/KR2021/005342, filed on Apr. 28, 2021, which is based on and claims the benefit of a Korean patent application number 10-2020-0057601, filed on May 14, 2020, in the Korean Intellectual Property Office, the disclosure of each of which is incorporated by reference herein in its entirety.

BACKGROUND

1. Field

The disclosure relates to an electronic device and an antenna control technology of the electronic device.

2. Description of Related Art

Recent electronic devices may transmit and receive data with external devices through wireless communication. For example, wireless-fidelity (Wi-Fi) is a wireless local area network (LAN) technology which facilitates high-performance wireless communication, which is widely used. The Wi-Fi may use frequencies of a 2.4 GHz band and a 5 GHz band, which are specified as industrial scientific and medical (ISM) bands. Recently, the Wi-Fi Alliance announced a standard for Wi-Fi communication (e.g., Wi-Fi 6) in the 6 GHz band which supports higher performance and faster data transmission speed. Thus, devices which support Wi-Fi 6 have been distributed.

The above information is presented as background information only to assist with an understanding of the disclosure. No determination has been made, and no assertion is made, as to whether any of the above might be applicable as prior art with regard to the disclosure.

SUMMARY

For an electronic device to scan a channel in a wide frequency band using one core (e.g., an antenna) having a specified frequency band characteristic, a time consumed to scan a channel may increase due to an iterative channel scan operation or power consumption according to it may increase.

Furthermore, when the communication channel is determined and when the electronic device performs communication using a frequency band characteristic wider than the determined channel, unnecessary power consumption may occur and the quality of communication may deteriorate.

Aspects of the disclosure are to address at least the above-mentioned problems and/or disadvantages and to provide at least the advantages described below. Accordingly, an aspect of the disclosure is to provide an electronic device for adjusting a frequency band characteristic of an antenna and effectively performing communication to reduce unnecessary power consumption and time consumption and an antenna control method of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit including at least one antenna, a memory, and a processor operatively connected with the communication circuit and the memory. The memory includes instructions that, when executed by the processor, cause the processor to identify a communication state of the communication circuit, adjust a characteristic of the antenna to a wideband characteristic including a first wireless-fidelity (Wi-Fi) band and a second Wi-Fi band by means of the communication circuit to scan a Wi-Fi communication channel, when the identified communication state is a state where the Wi-Fi communication channel is scanned, and adjust the characteristic of the antenna to a narrowband characteristic corresponding to a determined communication channel to perform Wi-Fi communication, when the identified communication state is a state where the Wi-Fi communication channel to communicate is determined.

In accordance with another aspect of the disclosure, an antenna control method of an electronic device is provided. The antenna control method includes identifying a communication state of a communication circuit of the electronic device, adjusting a characteristic of an antenna included in the communication circuit of the electronic device to a wideband characteristic including a first wireless-fidelity (Wi-Fi) band and a second Wi-Fi band by means of the communication circuit to scan a Wi-Fi communication channel, when the identified communication state is a state where the Wi-Fi communication channel is scanned, determining a communication channel to perform communication based on a result of the scan, and adjusting the characteristic of the antenna to a narrowband characteristic corresponding to the determined communication channel by means of the communication circuit.

In accordance with another aspect of the disclosure, an electronic device is provided. The electronic device includes a communication circuit including at least one antenna, a wireless-fidelity (Wi-Fi) module, and an ultra wide band (UWB) module, a memory, and a processor operatively connected with the communication circuit and the memory. The memory includes instructions, when executed, causing the processor to identify communication states of the Wi-Fi module and the UWB module, adjust a characteristic of the antenna to a first band characteristic corresponding to at least a portion of a UWB communication band by means of the communication circuit, when performing communication by means of the UWB module, and electrically connect the antenna with the UWB module, and adjust the characteristic of the antenna to a second band characteristic corresponding to at least a portion of a Wi-Fi communication band by means of the communication circuit, when performing communication by means of the Wi-Fi module, and electrically connect the antenna with the Wi-Fi module.

According to various embodiments disclosed in the disclosure, the characteristic of the antenna may be adjusted based on a connection state of a communication channel.

According to various embodiments disclosed in the disclosure, the antenna may be adjusted to a wideband characteristic in a state where the communication channel is scanned and the antenna may be adjusted to a narrowband characteristic in a state where the communication channel is determined, thus providing efficient channel scan and communication.

According to various embodiments disclosed in the disclosure, the characteristic of the antenna may be adjusted according to a connection state and a communication situation of the communication channel, thus reducing unnecessary communication power consumption and time consumption and providing efficient communication.

According to various embodiments disclosed in the disclosure, 6 GHz band Wi-Fi and UWB communication may be effectively supported using one antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
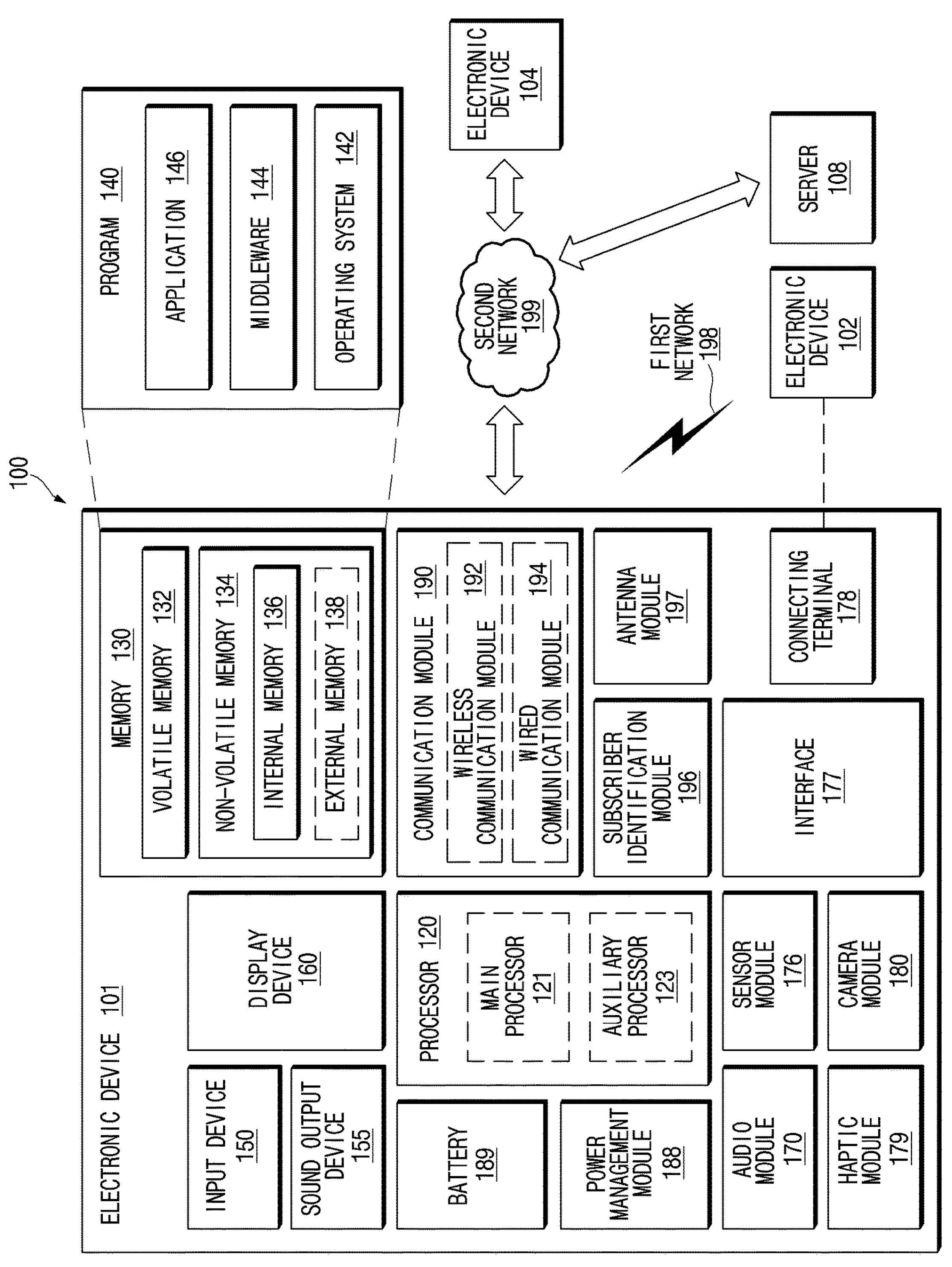
FIG. 1 illustrates an electronic device in a network environment according to an embodiment of the disclosure.

FIG. 1 is a block diagram of an electronic device 101 in a network environment 100 according to an embodiment of the disclosure.

Referring to FIG. 1, the electronic device 101 (e.g., the electronic device 101 in FIG. 1) may communicate with an electronic device 102 through a first network 198 (e.g., a short-range wireless communication network) or may communicate with an electronic device 104 or a server 108 through a second network 199 (e.g., a long-distance wireless communication network) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102) (e.g., a speaker or a headphone) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device 104 through the first network 198 (e.g., the short-range communication network such as a Bluetooth, a Wi-Fi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device). According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an serial peripheral interface (SPI), or an mobile industry processor interface (MIPI)) used between peripheral devices to exchange signals (e.g., a command or data) with each other.

According to an embodiment, the command or data may be transmitted or received between the electronic device 101 and the external electronic device 104 through the server 108 connected to the second network 199. Each of the external electronic devices 102 and 104 may be the same or different types as or from the electronic device 101. According to an embodiment, all or some of the operations performed by the electronic device 101 may be performed by one or more external electronic devices among the external electronic devices 102 and 104, or the server 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
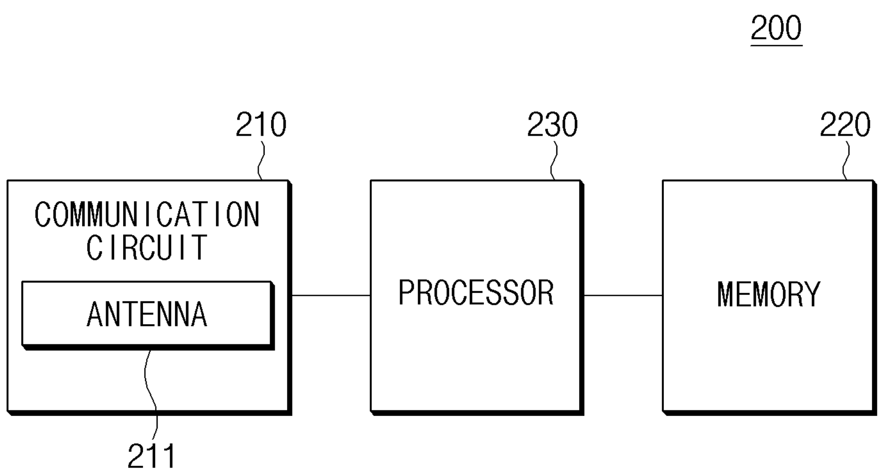
FIG. 2 is a block diagram of an electronic device according to an embodiment of the disclosure.

FIG. 2 is a block diagram of an electronic device according to an embodiment of the disclosure.

According to an embodiment, an electronic device 200 (e.g., an electronic device 101 of FIG. 1) may include a communication circuit 210 (e.g., a communication module 190 of FIG. 1), a memory 220 (e.g., a memory 130 of FIG. 1), and a processor 230 (e.g., a processor 120 of FIG. 1).

According to an embodiment, the communication circuit 210 may perform wireless communication (e.g., Wi-Fi communication, ultra wide band (UWB) communication, and/or Bluetooth (BT) communication) with an external electronic device (e.g., an electronic device 102 of FIG. 1), under control of the processor 230 or independently. According to an embodiment, the communication circuit 210 may be composed of a module or a chipset divided for each communication scheme. For example, the communication circuit 210 may include a Wi-Fi module, a UWB module, and/or a BT module.

According to an embodiment, the communication circuit 210 may include at least one antenna 211. For example, the communication circuit 210 may include a plurality of antennas 211 corresponding to different communication schemes or different frequency bands and may include one antenna 211 which supports various communication schemes and/or various frequency bands. According to an embodiment, the communication circuit 210 may include a variable circuit for controlling a characteristic of the at least one antenna 211. According to an embodiment, the variable circuit may include at least one switch and/or lumped components. According to an embodiment, the at least one antenna 211 may be adjusted in frequency band characteristic, under control of the processor 230.

According to an embodiment, the memory 220 may store at least one program, an application, data, or instructions executed by the processor 230. According to an embodiment, the memory 220 may store information necessary to perform communication. For example, the memory 220 may store information of supportable communication (e.g., Wi-Fi, Bluetooth, and/or UWB), supportable communication band information (e.g., Wi-Fi communication band or a UWB communication band) and/or information (e.g., a service set identifier (SSID)) of an external electronic device to perform communication. According to an embodiment, the memory 220 may store information necessary to control the antenna 211. For example, the memory 220 may store information of a band supportable by the antenna 211, data for adjusting a characteristic of the antenna 211, and/or information of a characteristic or a gain of the antenna 211 according to a communication state.

According to an embodiment, the processor 230 may recognize a connection state of a communication channel. For example, the processor 230 may recognize whether the current connection state of the communication channel is a state where a Wi-Fi communication channel is scanned or a state where the Wi-Fi communication channel is determined. According to an embodiment, the state where the communication channel is scanned may include at least one of a communication channel scan state for searching for the at least one external electronic device 200 (e.g., an AP) to perform Wi-Fi communication, a communication channel scan state for indoor positioning of the electronic device 200, or a communication channel scan state for roaming settings of the electronic device 200. For example, the processor 230 may receive signal intensity and/or location information of the external electronic device 200 (e.g., the AP) which is present around the electronic device 200 based on a specified time or a specified condition for indoor positioning. According to an embodiment, the specified condition may include global positioning system (GPS) signal intensity, a specified location, a specified time period, and/or a change in value of at least one sensor included in the electronic device 200. For example, the processor 230 may perform an operation similar to an operation of scanning the external electronic device 200 to substantially determine a Wi-Fi communication channel for indoor positioning. For example, the processor 230 may receive information about the surrounding external electronic device 200 for roaming settings and may perform an operation similar to an operation of scanning the external electronic device 200 to substantially determine a Wi-Fi communication channel According to an embodiment, when a communication situation deteriorates while the electronic device 200 performs Wi-Fi communication with a specific external electronic device 200 (e.g., an access point) (e.g., when communication quality decreases to a specified level or less), the processor 230 may switch the electronic device 200 to a state for scanning a communication channel to search for a new external electronic device 200 (e.g., a new access point). According to various embodiments, the processor 230 may switch the electronic device 200 to a state for scanning a communication channel based on a request of a user or a request of a system. For example, when the user runs a specified application (e.g., an indoor positioning application), the processor 230 may switch to a state for scanning a communication channel based on a communication connection state of the electronic device 200.

According to an embodiment, the processor 230 may adjust a characteristic of the antenna 211 to a wideband characteristic, in a state where a Wi-Fi communication channel is scanned. For example, the processor 230 may adjust the characteristic of the antenna 211 such that the antenna 211 operates in a band including a first Wi-Fi band and a second Wi-Fi band. For example, the first Wi-Fi band may include a 5 GHz Wi-Fi band, and the second Wi-Fi band may include a 6 GHz Wi-Fi band. According to an embodiment, the processor 230 may adjust the characteristic of the antenna 211 using a variable circuit connected with the antenna 211. For example, the variable circuit may include at least one switch and/or lumped components (e.g., a capacitor, an inductor, and/or a stub). For example, the processor 230 may control the switch to electrically connect or block at least one lumped component with or from the antenna 211, thus adjusting the characteristic of the antenna 211. For example, the processor 230 may scan a communication channel in the entire range including the 5 GHz Wi-Fi band and the 6 GHz Wi-Fi band using the antenna 211 having a wideband characteristic (e.g., about 5.15 GHz to 7.125 GHz band characteristic). For example, the processor 230 may set an antenna gain to only a degree necessary to scan a communication channel and may increase an operating frequency band of the antenna 211 to scan the communication channel in a wide band, thus reducing power and time consumed to scan the communication channel.

According to an embodiment, in the state where the Wi-Fi communication channel is determined, the processor 230 may adjust the characteristic of the antenna 211 to a narrowband characteristic (e.g., a band of a specified range (e.g., 20 MHz, 40 MHz, 80 MHz, or 160 MHz) in 5.150 GHz to 5.835 Ghz band or a band of a specified range in 5.925 GHz to 7.125 GHz band). For example, when the communication channel is determined, the processor 230 may perform Wi-Fi communication with the specific external electronic device 200 (e.g., the AP) over the determined communication channel According to an embodiment, the processor 230 may adjust the characteristic of the antenna 211 such that the antenna 211 operates in a band corresponding to the determined communication channel. For example, the processor 230 may adjust the characteristic of the antenna 211 to a narrowband of a specified band for smooth communication in the determined communication channel and may increase a gain of the antenna 211 in the specified band. For example, the processor 230 may perform Wi-Fi communication with the specified external electronic device 200 over the determined communication channel using the antenna 211 having a narrowband characteristic. For example, when determining the communication channel to the specific external electronic device 200 (e.g., the AP), the processor 230 may perform communication with the corresponding external electronic device 200 through the antenna 211.

According to an embodiment, the processor 230 may determine a communication scheme to be used. For example, when the communication circuit 210 of the electronic device 200 includes a Wi-Fi module (a Wi-Fi chipset) and an ultra wide band (UWB) module (or a UWB chipset), the processor 230 may receive information associated with each communication state from each of the Wi-Fi module and the UWB module. For example, the processor 230 may determine a communication scheme to be used based on the received information. According to an embodiment, the processor 230 may receive ultra wide band (UWB) communication-related information from the UWB module while the electronic device 200 performs Wi-Fi communication. For example, the UWB communication-related information may include UWB ranging period-related information. For example, the band of UWB communication may be at least partially common with the Wi-Fi communication band (e.g., the 5 GHz band and/or the 6 GHz band). According to an embodiment, the processor 230 may receive UWB communication-related information from at least one of the communication modules. For example, the processor 230 may receive UWB communication-related information through the Bluetooth module or the Wi-Fi module. For example, each communication module may exchange information through the processor 230 or may directly exchange information and may provide information to the processor 230.

According to an embodiment, the electronic device 200 may determine to perform UWB communication based on the received UWB communication-related information. According to an embodiment, the electronic device 200 may process the UWB communication-related information in a higher priority than Wi-Fi communication-related information. For example, when receiving the UWB communication-related information while performing Wi-Fi communication, the electronic device 200 may determine to perform UWB communication. According to an embodiment, when receiving Wi-Fi communication-related information about a specified event (e.g., an emergency event), the electronic device 200 may process Wi-Fi communication in a higher priority than UWB communication. For example, the specified event (e.g., the emergency event) may include a phone call or an accident occurrence notification event using Wi-Fi communication. According to an embodiment, the processor 230 may control the switch connected with the antenna 211 to adjust the characteristic of the antenna 211 such that the antenna 211 operates in a band including at least a portion (e.g., the 5 GHz and/or 6 GHz band(s)) of the UWB communication band. According to an embodiment, the electronic device 200 may adjust the characteristic of the antenna 211 to a wideband characteristic to correspond to at least a portion of the UWB communication band, depending on a specified period based on the UWB communication-related information (e.g., the UWB ranging period-related information). According to an embodiment, the processor 230 may perform UWB communication using the antenna 211, the characteristic of which is adjusted.

Figure 3A:
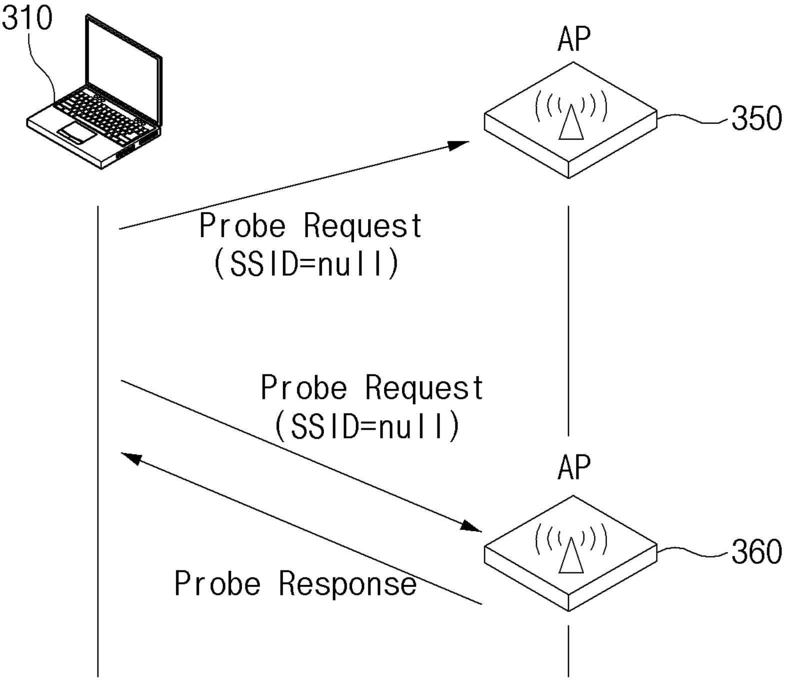
FIGS. 3A, 3B, and 3C illustrate communication connection schemes according to various embodiments of the disclosure.
Figure 3B:
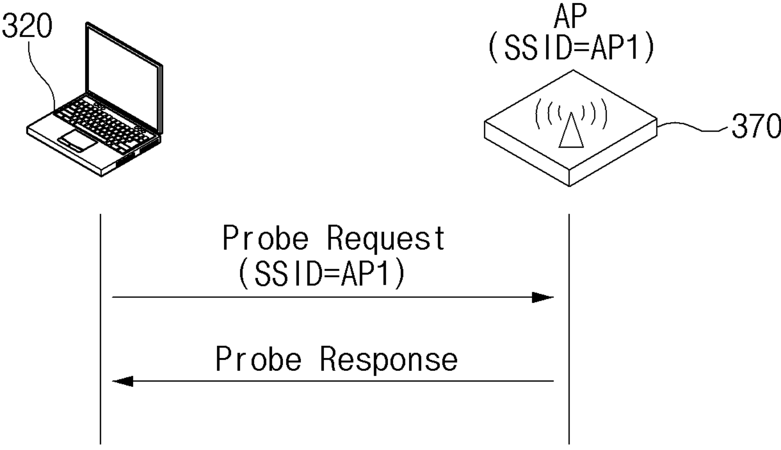
Figure 3C:
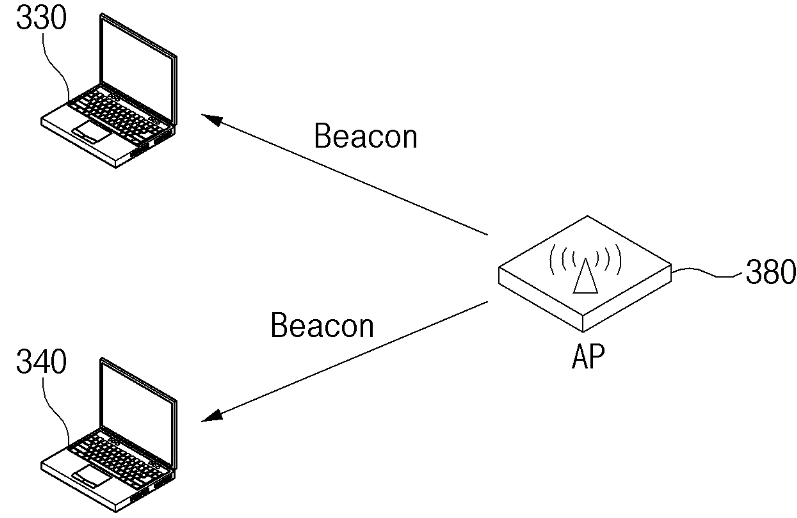

FIGS. 3A, 3B, and 3C illustrate communication connection schemes according to various embodiments of the disclosure.

According to an embodiment, an electronic device 310, 320, or 330 (e.g., an electronic device 101 of FIG. 1 or an electronic device 200 of FIG. 2) may obtain network information from a surrounding wireless access point (AP). For example, there are roughly an active scanning scheme and a passive scanning scheme as schemes where the electronic device 310, 320, or 330 obtains the network information from an AP 350, 360, 370, or 380. For example, the active scanning scheme is a scheme where the electronic device 310 or 320 transmits a probe request (e.g., a probe request frame) and receives a probe response (e.g., a beacon frame)

to the probe request transmitted from the AP 350, 360, or 370 to obtain network information. For example, the passive scanning scheme is a scheme where the electronic device 330 receives a beacon frame from the surrounding AP 380 to obtain network information.

Referring to FIG. 3A, the case where the electronic device 310 does not specify a specific service set identifier (SSID) and scans the APs 350 and 360 in the active scanning scheme is illustrated. For example, when configuring a probe request, the electronic device 310 may does not set an SSID of a probe request frame and may set an SSID field to 0 (null). For example, the electronic device 310 may broadcast the configured probe request. For example, each of the APs 350 and 360 around the electronic device 310, which receive the probe request from the electronic device 310, may transmit a probe response to the electronic device 310. For example, the electronic device 310 may obtain network information based on the received probe response.

Referring to FIG. 3B, the case where the electronic device 320 specifies a specific service set identifier (SSID) and scans the AP 370 in the active scanning scheme. For example, the electronic device 320 may specify the specific SSID and may transmit a probe request. For example, when the electronic device 320 is configured to access a specified wireless network, has a history where it was connected with the specified wireless network, or is already connected with the wireless network, it may set an SSID corresponding to the connected wireless network or the established wireless network, when configuring the probe request. For example, when configuring the probe request, the electronic device 320 may set an SSID (AP1) corresponding to the specified AP 370 in an SSID field of the probe request frame. For example, the electronic device 320 may unicast the probe request in which the specific SSID is set to the corresponding AP 370. For example, receiving the probe request from the electronic device 320, the AP 370 may transmit a probe response to the electronic device 320. For example, the electronic device 320 may obtain network information based on the received probe response.

Referring to FIG. 3C, the case where the electronic device 330 scans the AP 380 in the passive scanning scheme is illustrated. For example, the AP 380 may transmit a beacon frame to a surrounding device (e.g., the electronic device 330 and the external electronic device 340) on a periodic basis. For example, the electronic device 330 may receive the beacon frame from the surrounding AP 380 on a periodic basis and may obtain information of a network based on the received beacon frame.

When the electronic device 310, 320, or 330 performs a scan operation for all communication channels, power consumption may increase, irrespective of the passive scanning scheme and the active scanning scheme. According to an embodiment of the disclosure, the electronic device 310, 320, or 330 may differently control a characteristic of an antenna depending on whether there are a state where the communication channel is scanned and a state where the communication channel is determined to perform communication using an antenna characteristic suitable for the communication state, thus reducing unnecessary power consumption and/or time consumption.

Figure 4A:
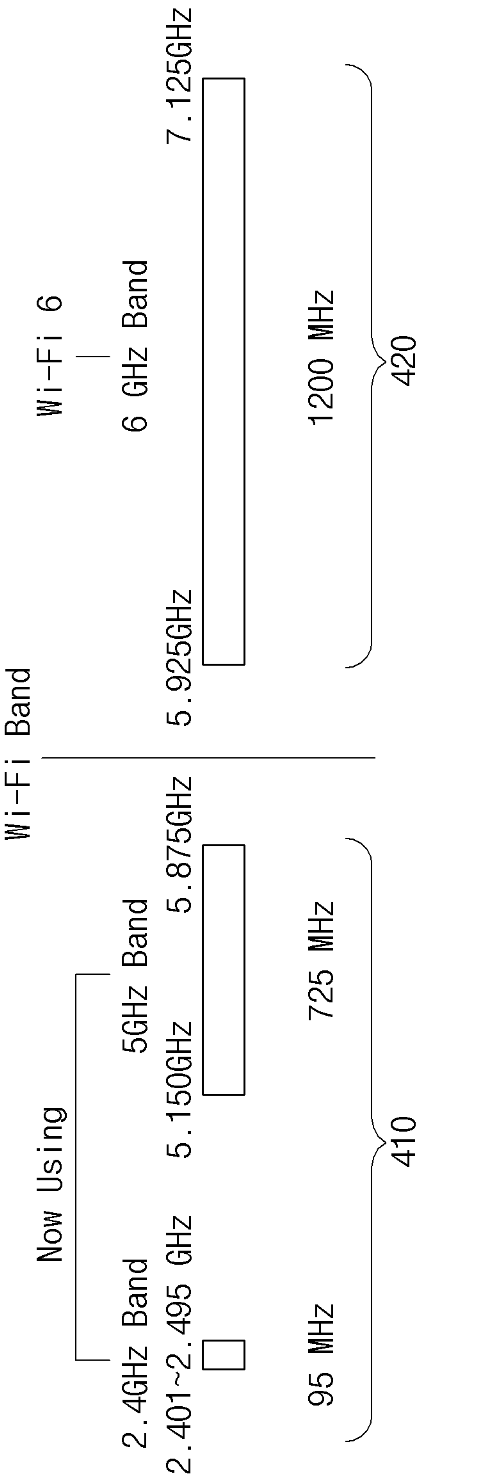
FIGS. 4A and 4B illustrate a Wi-Fi band supported by an electronic device according to various embodiments of the disclosure.
Figure 4B:
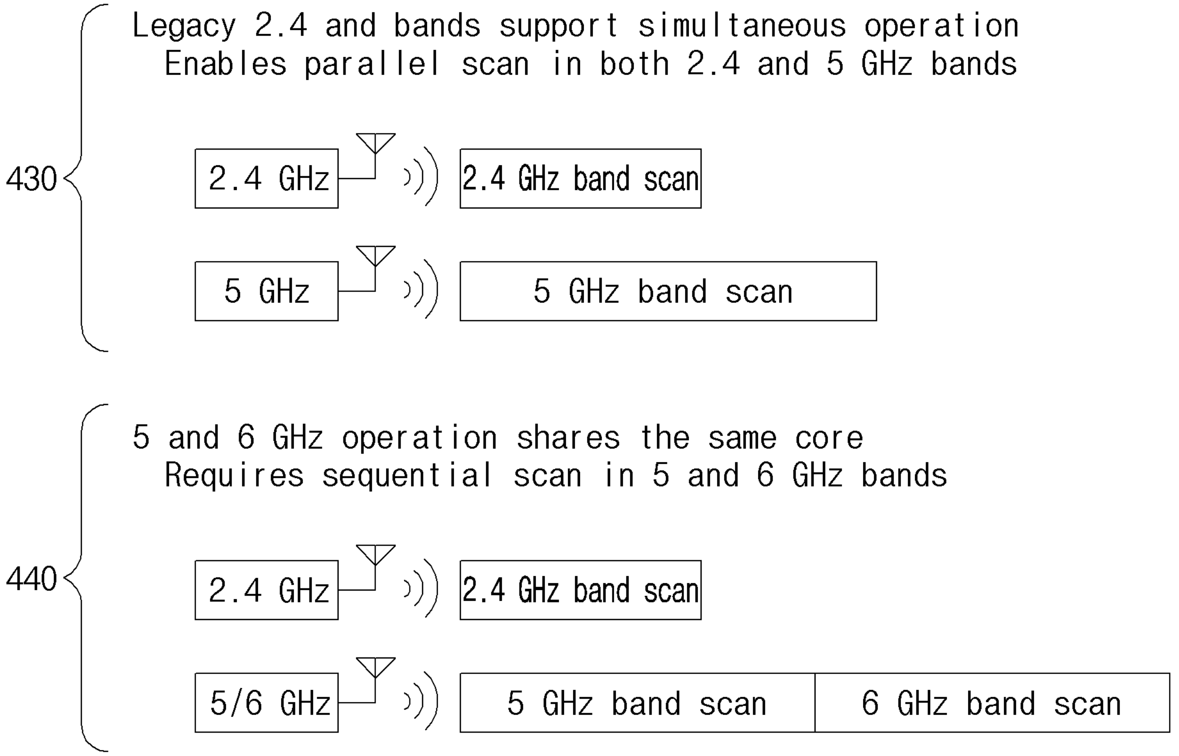

FIGS. 4A and 4B illustrate a Wi-Fi band supported by an electronic device according to various embodiments of the disclosure.

Referring to FIG. 4A, 410 denotes a band supported in 2.4 GHz and 5 GHz band Wi-Fi communication, and 420 denotes a band newly allocated in Wi-Fi communication. The Wi-Fi communication supports a 2.4 GHz band and a 5 GHz band (410). However, recently, a 6 GHz band is allocated as a new Wi-Fi service band (420). Thus, supporting the 6 GHz band Wi-Fi communication, an electronic device may need to perform an operation of scanning a communication channel for the 6 GHz band as well as an operation of scanning a communication channel for the existing 2.4 GHz and 5 GHz bands.

A bandwidth of the 6 GHz band newly allocated in the Wi-Fi communication is 1.2 GHz, which is a bandwidth which is relatively greater than a 95 MHz bandwidth of the existing 2.4 GHz band and a 670 MHz to 675 MHz bandwidth of the 5 GHz band. Thus, the operation where the electronic device scans the entire bandwidth of the Wi-Fi 6 GHz band may take a lot of time.

Referring to FIG. 4B, 430 illustrates supporting only 2.4 GHz and 5 GHz bands in Wi-Fi communication, and 440 illustrates supporting a 6 GHz band newly allocated in Wi-Fi communication.

Referring to 430, an electronic device (e.g., an electronic device 101 of FIG. 1 or an electronic device 200 of FIG. 2) may include a core (e.g., a communication module 190 of FIG. 1 or a communication circuit 210 of FIG. 2) corresponding to each of the 2.4 GHz and 5 GHz bands. For example, when there are only the 2.4 GHz and 5 GHz bands as Wi-Fi bands, the electronic device may scan both the 2.4 GHz and 5 GHz bands at the same time using different cores for each of the 2.4 GHz and 5 GHz bands.

Referring to 440, as the Wi-Fi 6 GHz band is additionally allocated, the electronic device (e.g., the electronic device 101 of FIG. 1 or the electronic device 200 of FIG. 2) may support Wi-Fi of the 2.4 GHz, 5 GHz, and 6 GHz bands. It may be difficult for the electronic device to have antennas indefinitely due to space constraints. Performing communication using one antenna between bands (e.g., the 5 GHz Wi-Fi band and the 6 GHz Wi-Fi band) adjacent to each other may facilitate efficient communication. For example, the electronic device may share a core (or an antenna) with respect to the 5 GHz band and the 6 GHz band to perform an operation. When the electronic device covers the 5 GHz band and the 6 GHz band using the same antenna and uses the antenna in only a specified characteristic (e.g., an antenna gain and/or an operating frequency band of the antenna), time and power consumption may increase to scan a communication channel Thus, it may be difficult to provide efficient communication performance in a frequency domain of a wide bandwidth using only one antenna pattern (e.g., one antenna characteristic). According to an embodiment of the disclosure, the electronic device may differently control a characteristic of the antenna depending on whether there are a state where the communication channel is scanned and a state where the communication channel is determined to perform communication using an antenna characteristic suitable for the communication state, thus reducing unnecessary power consumption and time consumption. Hereinafter, embodiments of the disclosure will be described in detail.

Figure 5A:
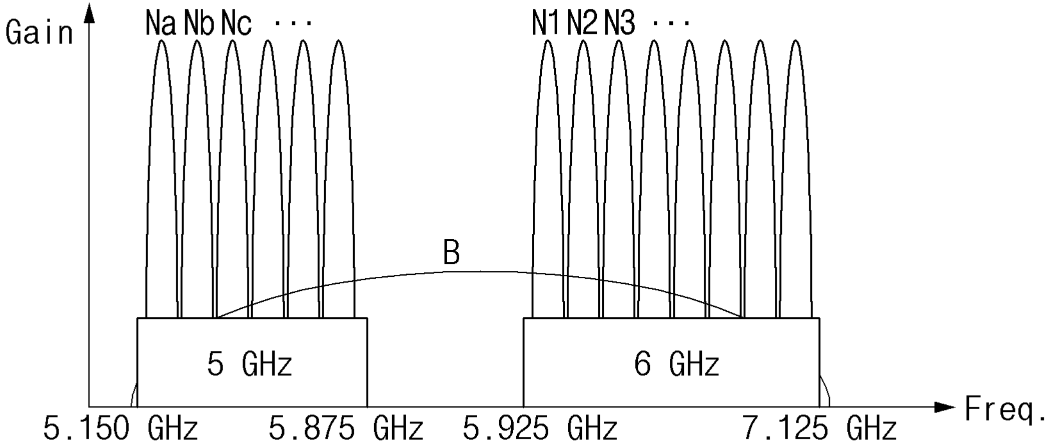
FIGS. 5A and 5B are drawings for describing an operation of controlling a characteristic of an antenna in an electronic device according to various embodiments of the disclosure.
Figure 5B:
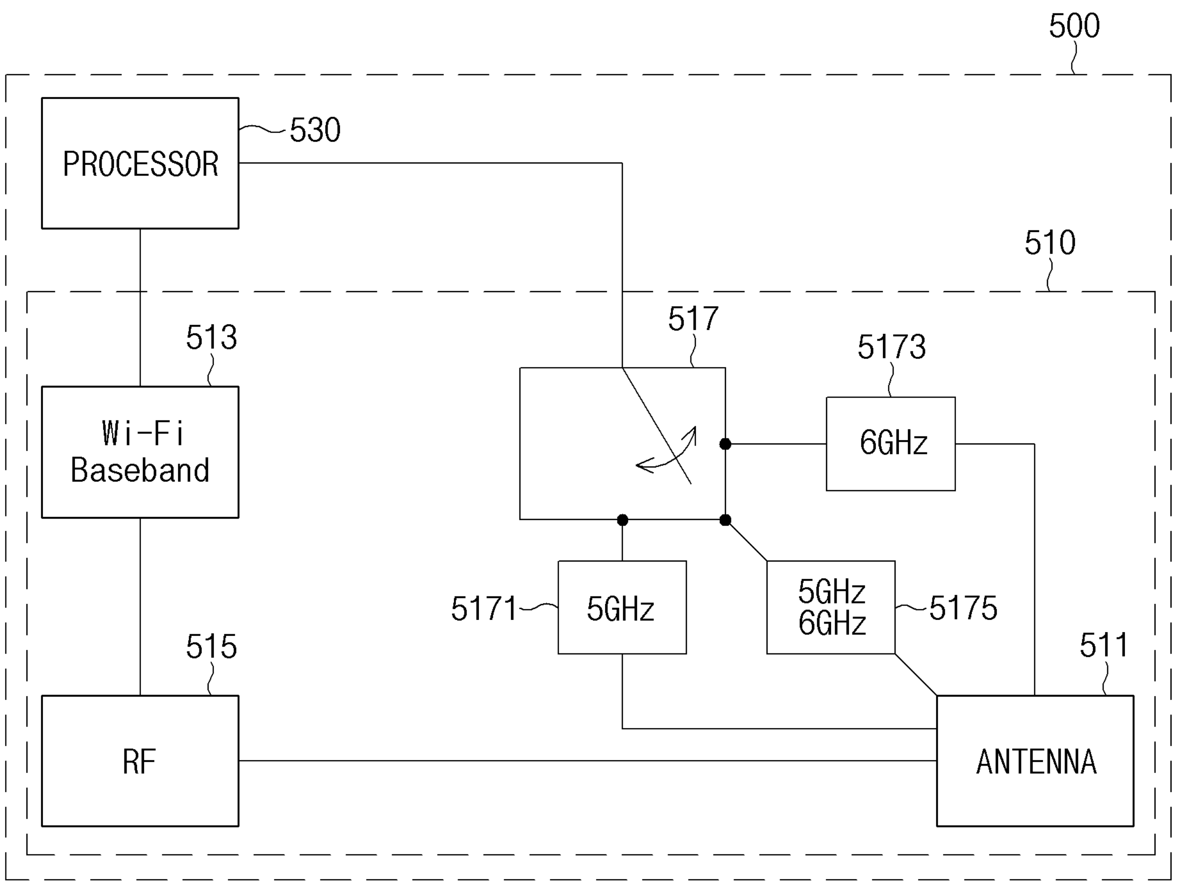

FIGS. 5A and 5B are drawings for describing an operation of controlling a characteristic of an antenna in an electronic device according to various embodiments of the disclosure.

Referring to FIG. 5A, a Wi-Fi frequency band available to an electronic device 500 (e.g., an electronic device 101 of FIG. 1 or an electronic device 200 of FIG. 2) according to an embodiment and an antenna characteristic (an antenna gain) are illustrated. FIG. 5A illustrates Wi-Fi bands of a 5 GHz band a 6 GHz band for convenience of description, but not limited thereto. The electronic device 500 may perform communication in a Wi-Fi band of a 2.4 GHZ band.

According to an embodiment, the electronic device 500 may adjust a characteristic of an antenna 511 (e.g., an antenna gain and/or an operating frequency band of the antenna) to have a large gain in a relatively narrow band (e.g., a 20 MHz, 40 MHz, 80 MHz, or 160 MHz bandwidth). For example, the electronic device 500 may adjust the characteristic of the antenna 511 to have a high gain, such as Na, Nb, Nc, . . . , in a 5 GHz frequency band, and correspond to a specific communication channel and may adjust the characteristic of the antenna 511 to have a high gain, such as N1, N2, N3, . . . , in a 6 GHz frequency band, and correspond to a specific communication channel. For example, each of Na, Nb, Nc, . . . and N1, N2, N3, . . . may be set to a 20 MHz, 40 MHz, 80 MHz, or 160 MHz bandwidth. According to an embodiment, the electronic device 500 may adjust the characteristic of the antenna 511 to a wideband characteristic B in a state where a communication channel is scanned and may scan an external electronic device 500 (e.g., an AP). For example, a 2.4 GHz band supported in Wi-Fi communication may be a 2.401 GHz to 2.495 GHz band, a 5 GHz band may be a 5.150 GHz to 5.875 GHz band, and a 6 GHz may be a 5.925 GHz to 7.125 GHz band. For example, to cover the Wi-Fi 5 GHz and 6 GHz band using the same antenna, the electronic device 500 may adjust the characteristic of the antenna to cover a 1.975 GHz bandwidth of a 5.150 GHz to 7.125 GHz band. For example, when scanning the communication channel, because the electronic device 500 transmits and receives data for scanning a channel without transmitting and receiving relatively large data with an external electronic device (e.g., an electronic device 102 of FIG. 1), it may scan a communication channel although the antenna 511 has a relatively low gain. For example, the electronic device 500 may adjust the characteristic of the antenna 511 to cover the entire band for a communication channel while maintaining a minimum antenna gain for scanning the communication channel. For example, the minimum antenna gain may be an antenna gain of a level capable of transmitting and receiving a signal with the external electronic device and dividing a frequency band used by the external electronic device. According to an embodiment, the electronic device 500 may adjust the characteristic of the antenna 511 to a wideband to cover the entire range for scanning a communication channel rather than having a relatively low gain, thus efficiently scanning the communication channel.

According to an embodiment, the electronic device 500 may adjust the characteristic of the antenna 511 to have a small gain in a relatively wide band. For example, the electronic device 500 may adjust the characteristic of the antenna 511 to have a low gain in a wideband including the 5 GHz band and the 6 GHz band as shown in B. According to another embodiment, the electronic device 500 may adjust the characteristic of the antenna 511 to a wideband in which a plurality of portions of the 5 GHz band and the 6 GHz band. For example, the electronic device 500 may adjust the characteristic of the antenna 511 to have a low gain in the 5 GHz frequency band or the 6 GHz frequency band. For another example, the electronic device 500 may adjust the characteristic of the antenna 511 to have a relatively low gain in a band including a plurality of bands among Na, Nb, Nc, or . . . in the 5 GHZ frequency band and/or among N1, N2, N3, or . . . in the 6 GHz frequency band. For example, the electronic device 500 may adjust the characteristic of the antenna 511 to operate in a band including at least some of N1, N2, N3, or . . . , may adjust the characteristic of the antenna 511 to operate in a band including at least some of Na, Nb, Nc, or . . . , or may adjust the characteristic of the antenna 511 to operate in a band including a plurality of bands among N1, N2, N3, . . . , Na, Nb, Nc, or . . . . For example, the electronic device 500 may adjust a gain of the antenna 511 depending on the adjusted band characteristic of the antenna 511. For example, the electronic device 500 may decrease a gain of the antenna 511, may increase a bandwidth of the antenna 511, and may fail to perform an operation of scanning the entire frequency band, thus reducing power consumption.

According to an embodiment, the electronic device 500 may determine a communication channel based on the signal received from the external electronic device (e.g., a Wi-Fi base station or an AP) using the antenna 511 adjusted to the wideband characteristic. For example, the electronic device 500 may receive a beacon signal or a probe response signal from the external electronic device. For example, the signal received by the electronic device 500 may include primary channel frequency information or channel bandwidth information. For example, a PHY header portion of the signal received by the electronic device 500 may include primary channel frequency information, and a MAC header portion may include channel bandwidth information. For example, the electronic device 500 may determine a communication channel based on information (e.g., primary channel frequency information and/or channel bandwidth information) included in the received signal.

According to an embodiment, the electronic device 500 may adjust the characteristic of the antenna 511 to a narrowband characteristic Na, Nb, Nc, N1, N2, or N3 in the state where the communication channel is determined and may perform communication with the external electronic device 500. For example, when a specific communication channel to communicate with the external electronic device 500 is determined, the electronic device 500 may adjust the characteristic of the antenna 511 to have a high gain in a band corresponding to the determined communication channel. For example, when the communication channel is determined, the characteristic of the antenna 511 may be adjusted to have a relatively high gain in the determined communication channel to efficiently perform communication with the external electronic device 500.

Referring to FIG. 5B, the electronic device 500 may include a communication circuit 510 (e.g., a communication module 190 of FIG. 1 or a communication circuit 210 of FIG. 2) and a processor 530 (e.g., a processor 120 of FIG. 1 or a processor 230 of FIG. 2). According to an embodiment, the communication circuit 510 may include an antenna 511, a Wi-Fi module (Wi-Fi baseband) 513, an RF module 515, a switch 517, and variable circuits 5171, 5173, and 5175 electrically connected with the antenna 511.

According to an embodiment, the Wi-Fi module 513 may be a module for performing Wi-Fi communication, which may provide the processor 530 with state information and/or operation-related information of the Wi-Fi module 513, may receive a control command from the processor 530, and may perform an operation corresponding to the received control command. For example, the Wi-Fi module 513 may generate a baseband signal necessary for Wi-Fi communication and may deliver it to the RF module 515.

According to an embodiment, the RF module 515 may amplify, up-convert, and deliver a band signal generated by the Wi-Fi module 513 to the antenna 511.

According to an embodiment, the antenna 511 may radiate the signal generated by the RF module 515 or may receive a signal radiated by the external electronic device. According to an embodiment, the antenna 511 may include at least one radiator and elements associated with the antenna 511. According to an embodiment, a characteristic of the antenna 511 (e.g., an antenna gain and/or an operating frequency band of the antenna) may be adjusted under control of the processor 530. According to an embodiment, the antenna 511 may include at least one antenna including a conductor formed on a substrate (e.g., a PCB) or a radiator composed of a conductive pattern. According to another embodiment, the antenna 511 may include at least one antenna which uses a portion of metal (e.g., a metal frame) making up a housing (not shown) of the electronic device 500. According to another embodiment, the antenna 511 may include at least one antenna which uses at least some of internal elements of the electronic device 500.

According to an embodiment, the switch 517 may electrically connect or block a lumped element (e.g., a capacitor, an inductor, and/or a stub) connected with the antenna 511 with or from the antenna 511. For example, the switch 517 may electrically connect or block at least one of the plurality of variable circuits 5171, 5173, and 5175 with or from the antenna 511, under control of the processor 530. According to an embodiment, the plurality of variable circuits 5171, 5173, and 5175 may include a switch and/or a lumped element (e.g., a capacitor, an inductor, and/or a stub).

According to an embodiment, the processor 530 may control the overall operation of the electronic device 500. According to an embodiment, the processor 530 may be connected with the communication circuit 510 (e.g., the Wi-Fi module 513 and the switch 517). For example, the processor 530 may control the Wi-Fi module 513 through a communication interface, such as a peripheral component interconnect express (PCIe) or a secure digital input/output (SDIO), with the Wi-Fi module 513. For example, the processor 530 may receive state information and operation-related information of the Wi-Fi module 513 from the Wi-Fi module 513 and may control the Wi-Fi module 513 based at least in part on the received information. According to an embodiment, the processor 530 may control the switch 517 based at least in part on the information received from the Wi-Fi module 513. For example, the processor 530 may control the switch 517 using a general-purpose input/output (GPIO) signal. For example, the processor 530 may control the switch 517 to electrically connect at least one of the variable circuits 5171, 5173, and 5175 with the antenna 511. According to an embodiment, the processor 530 may control the switch 517 to connect at least one of the variable circuits 5171, 5173, and 5175 with the antenna 511, such that the antenna 511 operates in a band including a 5 GHz band, a 6 GHz band, or the 5 GHz band and the 6 GHz band. For example, the electronic device 500 may connect the first variable circuit 5171 with the antenna 511 such that the antenna 511 operates in the 5 GHz band, may connect the second variable circuit 5173 with the antenna 511 such that the antenna 511 operates in the 6 GHz band, or may connect the third variable circuit 5175 with the antenna 511 such that the antenna 511 operates in the 5 GHz band and the 6 GHz band. In an embodiment, when the antenna 511 is connected with the first variable circuit 5171 or the second variable circuit 5173, it may have a specified narrowband characteristic and may have a relatively high antenna gain. For example, the first variable circuit 5171 may be configured such that the antenna 511 operates in at least a portion of the 5 GHz band. For example, the second variable circuit 5173 may be configured such that the antenna 511 operates in at least a portion of the 6 GHz band. According to an embodiment, in the state where the communication channel is determined, the processor 530 may control the switch 517 to connect the first variable circuit 5171 or the second variable circuit 5173 with the antenna 511, such that the antenna 511 has an antenna characteristic corresponding to the determined communication channel. For example, when the antenna 511 is connected with the third variable circuit 5175, it may have a wideband characteristic including the 5 GHz band and the 6 GHz band and may have a relatively low antenna gain. For example, in the state where the electronic device 500 scans the communication channel, the processor 530 may control the switch 517 to connect the third variable circuit 5175 with the antenna 511, such that the antenna 511 has an antenna characteristic including all of the 5 GHz band and the 5 GHz band.

According to various embodiments, the processor 530 may connect the third variable circuit 5175 with the antenna 511 and may adjust the antenna 511 to a wideband characteristic in a communication channel scan state for searching for the at least one external electronic device 500 to perform Wi-Fi communication, a communication channel scan state for indoor positioning of the electronic device 500, or a communication channel scan state for roaming settings. For example, the electronic device 500 may scan a communication channel for searching for a surrounding access point (AP) to access in a state where it does not access an AP for Wi-Fi communication. For another example, in the state where the electronic device 500 accesses the AP, when communication quality deteriorates and/or when the electronic device 500 wants to change the currently accessed AP to another AP, the electronic device 500 may scan a communication channel for roaming or handover. For another example, the electronic device 500 may obtain SSID information from surrounding APs and may scan a communication channel to identify a current location of the electronic device 500.

FIGS. 6A, 6B, 6C, and 6D illustrate examples of a variable circuit included in an electronic device according to various embodiments of the disclosure.

According to an embodiment, a communication circuit (e.g., a communication module 190 of FIG. 1 or a communication circuit 210 of FIG. 2) of an electronic device (e.g., an electronic device 101 of FIG. 1 or an electronic device 200 of FIG. 2) may include a variable circuit 630 for adjusting a characteristic of an antenna 601 (e.g., an antenna 211 of FIG. 2). According to an embodiment, the variable circuit 630 may include at least one switch 631 and lumped elements a, b, c, and d. The planar inverted F-type antenna is illustrated in FIGS. 6A, 6B, 6C, and 6D, but the type of antenna is not limited thereto. According to various embodiments, the electronic device may include various types of antennas.

Figure 6A:
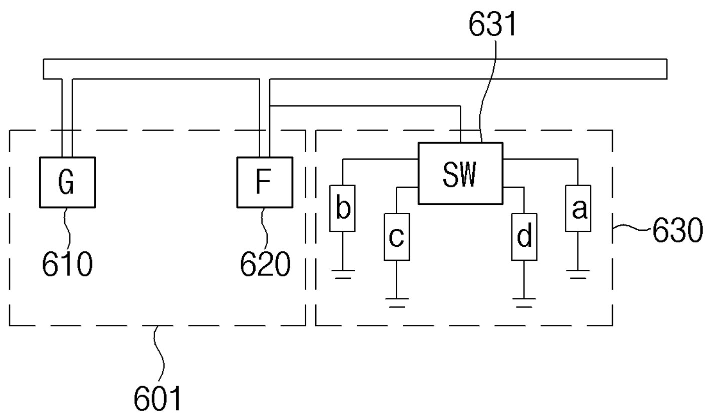
FIGS. 6A, 6B, 6C, and 6D illustrate examples of a variable circuit included in an electronic device according to various embodiments of the disclosure.
Figure 6B:
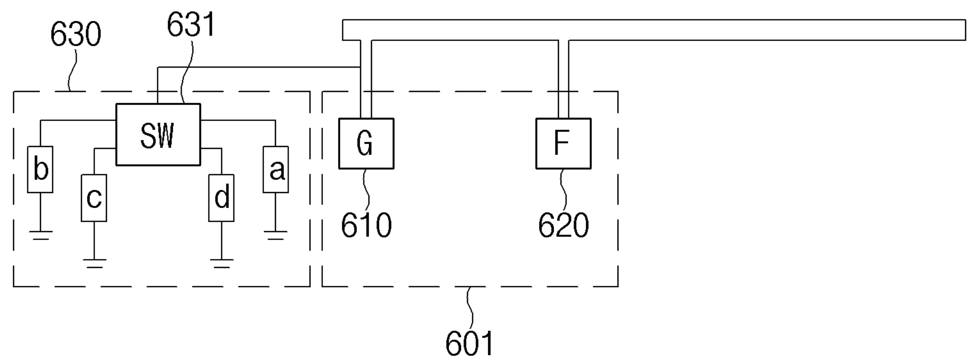
Figure 6C:
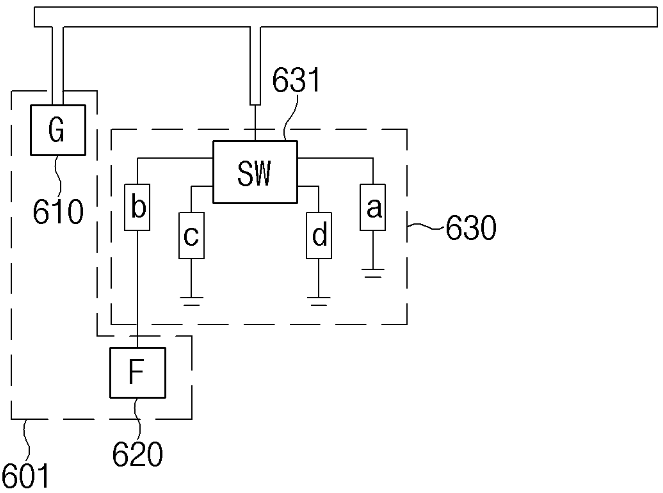
Figure 6D:
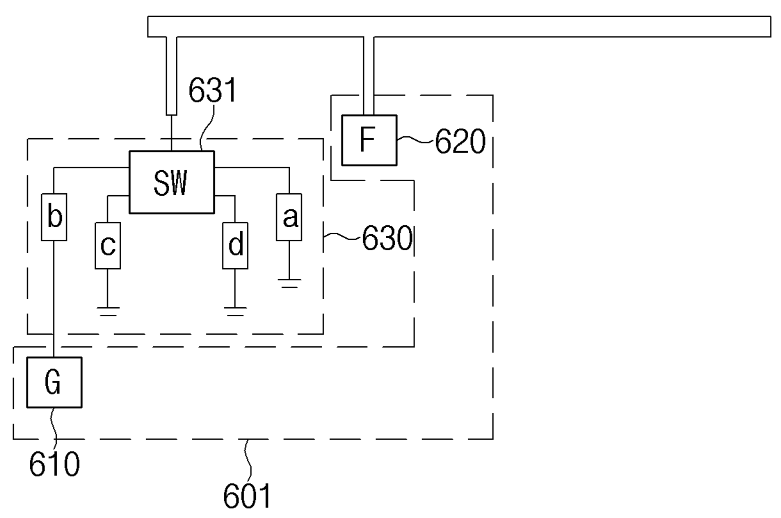

According to an embodiment, the at least one switch 631 may be electrically connected with at least a part of the antenna 601. Referring to FIG. 6A, a circuit structure in which the switch 631 is connected in parallel with an antenna feeding part (F) 620, and FIG. 6B illustrates a circuit structure in which the switch 631 is connected in parallel with an antenna ground part (G) 610. For example, FIG. 6C illustrates a circuit structure in which the switch 631 is connected in series with the antenna feeding part (F) 620, and FIG. 6D illustrates a circuit structure in which the switch 631 is connected in series with the antenna ground part (G) 610.

According to an embodiment, the at least one lumped element a, b, c, or d may be electrically connected with the switch 631. According to various embodiments, the lumped elements a, b, c, and d shown in FIGS. 6A, 6B, 6C, and 6D are schematically illustrated as an example, but not limited thereto. The at least one lumped element a, b, c, or d may be electrically connected in series or in parallel with the switch 631 in various forms. According to various embodiments, each of a, b, c, and d shown in FIGS. 6A, 6B, 6C, and 6D may be a circuit including one lumped element or a plurality of lumped elements. For example, each of a, b, c, and d may include an element or a circuit corresponding to a specified antenna band characteristic (or an antenna gain). For example, each of a, b, c, and d may be implemented as a lumped element, such as an inductor or a capacitor, or microstrip line, open stub, and/or short stub circuit(s). The four lumped elements a, b, c, and d are illustrated in FIGS. 6A, 6B, 6C, and 6D. However, according to various embodiments, the number of lumped elements may change an antenna band characteristic (or an antenna gain) in a specified frequency band, and a number or a form may be variously implemented. According to an embodiment, the electronic device may control the switch 631 to select at least one of the desired lumped elements a, b, c, or d. For example, the electronic device may adjust a characteristic of the antenna 601 to a narrowband characteristic or a wideband characteristic by controlling the switch 631 to select at least one of a, b, c, or d. For example, the electronic device may control the switch 631 such that a plurality of lumped elements are connected with the antenna 601 to have a low Q value to adjust the antenna 601 to the wideband characteristic or may control the switch 631 such that one lumped element is connected with the antenna 601 to have a high Q value to adjust the antenna 601 to the narrowband characteristic. For example, when connected with the antenna 601, each of a, b, c, and d may be configured such that the antenna 601 has a different band characteristic and/or a different antenna gain. For example, a, b, and c may be configured such that the antenna 601 has a relative narrowband characteristic and a high antenna gain, when connected with the antenna, and d may be configured such that the antenna 601 has a relative wideband characteristic and a low antenna gain, when connected with the antenna 601. For example, the electronic device may control the switch based on a communication state to selectively and electrically connect an appropriate lumped element among the plurality of lumped elements a, b, c, and d with the antenna 601.

For another example, to adjust a Q value, the electronic device may differently set a thickness and/or a length of a microstrip line, an open stub, and/or a short stub.

Figure 7:
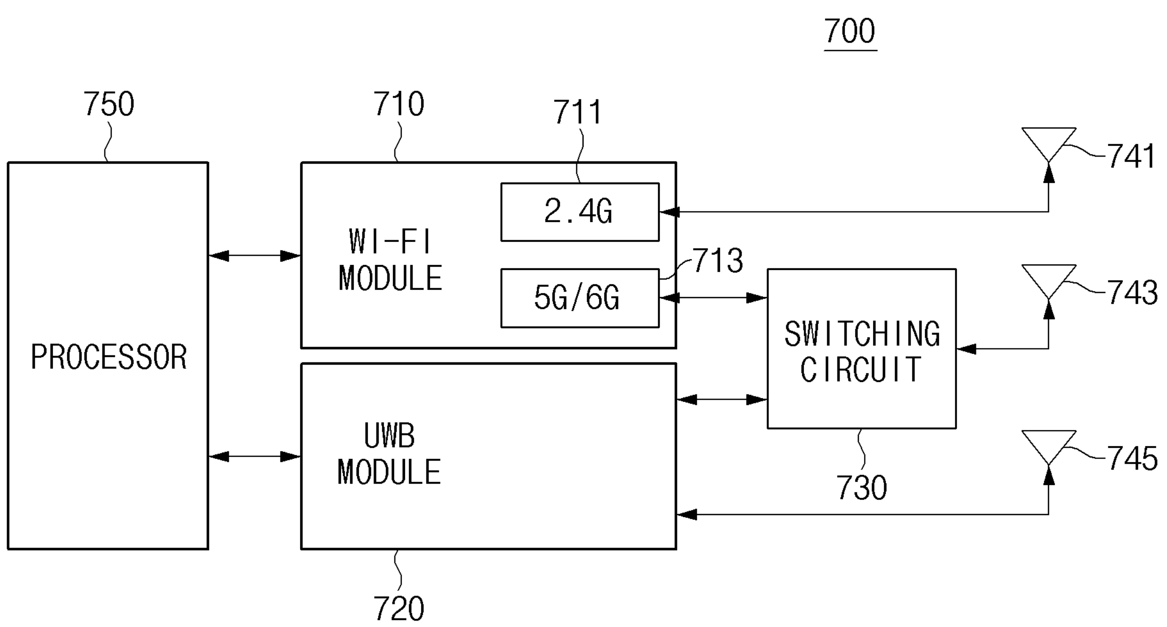
FIG. 7 is a block diagram of an electronic device according to an embodiment of the disclosure.

FIG. 7 is a block diagram of an electronic device according to an embodiment of the disclosure.

Referring to FIG. 7, the electronic device 700 (e.g., an electronic device 101 of FIG. 1, an electronic device 200 of FIG. 2 or an electronic device 500 of FIG. 5B) may include a Wi-Fi module 710, a UWB module 720, a switching circuit 730, a first antenna 741, a second antenna 743, a third antenna 745, and a processor 750 (e.g., a processor 120 of FIG. 1, a processor 230 of FIG. 2, or a processor 530 of FIG. 5B).

According to an embodiment, the Wi-Fi module 710 and the UWB module 720 may be implemented as one module (or chipset) (e.g., a communication module 190 of FIG. 1, a communication circuit 210 of FIG. 2, or a communication circuit 510 of FIG. 5B) and may be implemented as modules (or chipsets) which are independent of each other. According to an embodiment, the Wi-Fi module 710 may include a module 711 for supporting Wi-Fi of a 2.4 GHZ band and a module 713 for supporting Wi-Fi of 5 GHz and 6 GHz bands. For example, the modules 711 and 713 may be configured as independent modules and may be logically divided and configured in the one Wi-Fi module 710. According to an embodiment, the Wi-Fi module 710 and the UWB module 720 may transmit and receive information (e.g., communication state information and/or operation state information) with each other through an internal communication interface of the electronic device 700 or may transmit and receive information with each other through the processor 750.

According to an embodiment, the first antenna 741 may be configured to be used for 2.4 GHz band Wi-Fi communication, the second antenna 743 may be configured to be used for 5 GHz/6 GHz band Wi-Fi communication or UWB communication, and the third antenna 745 may be configured to be used for UWB communication. For example, the band supported in the UWB communication may be a 5 GHZ to 8 GHZ band, and at least a portion of the band supported in the UWB communication may overlap a band supported in the 5 GHz/6 GHz band Wi-Fi communication. For example, the second antenna 743 may be selectively used for the Wi-Fi communication or the UWB communication in a partial band supported in common in the Wi-Fi communication and the UWB communication under control of the processor 750.

According to an embodiment, the processor 750 may include an application processor (e.g., a main processor 121 of FIG. 1) and/or a communication processor (e.g., an auxiliary processor 123 of FIG. 1). According to an embodiment, the processor 750 may be electrically and/or operatively connected with the Wi-Fi module 710 and the UWB module 720. For example, the processor 750 may control the Wi-Fi module 710 and/or the UWB module 720 through a communication interface (e.g., a peripheral component interconnect express (PCIe) or a serial peripheral interface (SPI)). For example, the processor 750 may control the switching circuit 730 by means of a control signal (e.g., a general purpose I/O (GPIO) signal). For example, the electronic device 700 may control the switching circuit 730 to selectively connect the second antenna 743 with the Wi-Fi module 710 or the UWB module 720.

According to an embodiment, the processor 750 may receive information associated with a communication state from the Wi-Fi module 710 and/or the UWB module 720. For example, the processor 750 may receive communication-related information and/or information about an operation state from each of the Wi-Fi module 710 and/or the UWB module 720. For example, the processor 750 may receive UWB communication-related information (e.g., UWB ranging period-related information) from the UWB module 720.

According to an embodiment, when receiving the UWB communication-related information from the UWB module 720, during Wi-Fi communication through the Wi-Fi module 710, the processor 750 may adjust a characteristic of the second antenna 743 to correspond to UWB communication and may electrically connect the second antenna 743 with the UWB module 720. For example, the processor 750 may perform 5 GHz to 6 GHz band UWB communication using the second antenna 743 and may perform 7 GHz to 8 GHz band UWB communication using the third antenna 745. For example, the processor 750 may process the UWB communication in a higher priority than the Wi-Fi communication. According to an embodiment, when ending the UWB communication, the processor 750 may adjust the characteristic of the second antenna 743 to correspond to the Wi-Fi communication and may electrically connect the second antenna 743 with the Wi-Fi module 710. For example, the processor 750 may perform 2.4 GHz band Wi-Fi communication using the first antenna 741 and may perform 5 GHz to 6 GHz band Wi-Fi communication using the second antenna 743.

Referring to FIG. 7, the first antenna 741, the second antenna 743, and the third antenna 745, but the number of antennas included in the electronic device 700 is not limited thereto. The electronic device 700 may be implemented in various forms including at least one antenna (e.g., an antenna 211 of FIG. 2, an antenna 511 of FIG. 5B, an antenna 601 of FIGS. 6A, 6B, 6C, and 6D) controlled by the processor 750 and the switching circuit 730 (e.g., a switch 517 of FIG. 5B or a switch 631 of FIGS. 6A, 6B, 6C, and 6D). According to an embodiment, the electronic device 700 may include a variable circuit (e.g., variable circuits 5171, 5173, and 5175 of FIG. 5B or a variable circuit 630 of FIGS. 6A, 6B, 6C, and 6D), which is connected with the at least one antenna 741, 743, or 745 through the switching circuit 730, and/or a lumped element (e.g., lumped elements a, b, c, and d of FIGS. 6A, 6B, 6C, and 6D). For example, the electronic device 700 may include one antenna operable in the entire Wi-Fi communication support band (e.g., the 2.4 GHZ band, the 5 GHZ band, and the 6 GHZ band) and a UWB communication support band. For example, the electronic device 700 may include antennas used independently of each of the Wi-Fi module 710 and the UWB module 720 without an antenna used in common for the Wi-Fi module 710 and the UWB module 720. In this case, to reduce the influence of interference which may occur in the same or adjacent frequency band, the processor 750 may at least temporarily stop signal transmission according to Wi-Fi communication based on a UWB communication schedule.

An electronic device (e.g., an electronic device 101 of FIG. 1, an electronic device 200 of FIG. 2, an electronic device 500 of FIG. 5B, or an electronic device 700 of FIG. 7) according to an embodiment may include a communication circuit (e.g., a communication module 190 of FIG. 1, a communication circuit 210 of FIG. 2, a communication circuit 510 of FIG. 5B, or a Wi-Fi module 710 and a UWB module 720 of FIG. 7) including at least one antenna (e.g., an antenna 211 of FIG. 2, an antenna 511 of FIG. 5B, an antenna 601 of FIGS. 6A, 6B, 6C, and 6D, or antennas 741, 743, and 745 of FIG. 7); a memory (e.g., a memory 130 of FIG. 1 or a memory 220 of FIG. 2); and a processor (e.g., a processor 120 of FIG. 1, a processor 230 of FIG. 2, a processor 530 of FIG. 5B, or a processor 750 of FIG. 7) operatively connected with the communication circuit and the memory.

According to an embodiment, the memory may include instructions, when executed, causing the processor to identify a communication state of the communication circuit, adjust a characteristic of the antenna to a wideband characteristic including a first wireless-fidelity (Wi-Fi) band and a second Wi-Fi band by means of the communication circuit to scan a Wi-Fi communication channel, when the identified communication state is a state where the Wi-Fi communication channel is scanned, and adjust the characteristic of the antenna to a narrowband characteristic corresponding to a determined communication channel to perform Wi-Fi communication, when the identified communication state is a state where the Wi-Fi communication channel to communicate is determined.

According to an embodiment, the first Wi-Fi band may include a 5 GHz Wi-Fi band, and the second Wi-Fi band may include a 6 GHz Wi-Fi band.

According to an embodiment, the communication circuit may include at least one or more variable circuits (e.g., variable circuits 5171, 5173, and 5175 of FIG. 5B a variable circuit 630 of FIGS. 6A, 6B, 6C, and 6D, or a switching circuit 730 of FIG. 7) configured to adjust the characteristic of the antenna.

According to an embodiment, the variable circuit may include at least one switch (e.g., a switch 517 of FIG. 5B, a switch 631 of FIGS. 6A, 6B, 6C, and 6D, or a switching circuit 730 of FIG. 7) and lumped components (e.g., lumped components a, b, c, and d of FIGS. 6A, 6B, 6C, and 6D). According to an embodiment, the instructions may cause the processor to control the at least one switch to adjust the characteristic of the antenna.

According to an embodiment, the state where the communication channel is scanned may include at least one of a communication channel scan state for searching for at least one external electronic device to perform the Wi-Fi communication, a communication channel scan state for indoor positioning of the electronic device, or a communication channel scan state for roaming settings.

According to an embodiment, the instructions may cause the processor to adjust the characteristic of the antenna to a wideband characteristic including an ultra wide band (UWB) band, when receiving UWB communication-related information through the communication circuit.

According to an embodiment, the UWB communication-related information may include UWB ranging period-related information.

According to an embodiment, an electronic device (e.g., an electronic device 101 of FIG. 1, an electronic device 200 of FIG. 2, an electronic device 500 of FIG. 5B, or an electronic device 700 of FIG. 7) may include a communication circuit (e.g., a communication module 190 of FIG. 1, a communication circuit 210 of FIG. 2, or a communication circuit 510 of FIG. 5B) including at least one antenna (e.g., an antenna 211 of FIG. 2, an antenna 511 of FIG. 5B, an antenna 601 of FIGS. 6A, 6B, 6C, and 6D, or antennas 741, 743, and 745 of FIG. 7), a wireless-fidelity (Wi-Fi) module (e.g., a Wi-Fi module 710 of FIG. 7), and an ultra wide band (UWB) module (e.g., a UWB module 720 of FIG. 7); a memory (e.g., a memory 130 of FIG. 1 or a memory 220 of FIG. 2); and a processor (e.g., a processor 120 of FIG. 1, a processor 230 of FIG. 2, a processor 530 of FIG. 5B, or a processor 750 of FIG. 7) operatively connected with the communication circuit and the memory.

According to an embodiment, the memory may include instructions, when executed, causing the processor to identify communication states of the Wi-Fi module and the UWB module, adjust a characteristic of the antenna to a first band characteristic corresponding to at least a portion of a UWB communication band by means of the communication circuit, when performing communication by means of the UWB module, and electrically connect the antenna with the UWB module, and adjust the characteristic of the antenna to a second band characteristic corresponding to at least a portion of a Wi-Fi communication band by means of the communication circuit, when performing communication by means of the Wi-Fi module, and electrically connect the antenna with the Wi-Fi module.

According to an embodiment, the UWB communication band and the Wi-Fi communication band may include at least some of 5 GHZ and 6 GHZ communication bands.

According to an embodiment, the communication circuit may include a variable circuit (e.g., variable circuits 5171, 5173, and 5175 of FIG. 5B a variable circuit 630 of FIGS. 6A, 6B, 6C, and 6D, or a switching circuit 730 of FIG. 7) configured to adjust the characteristic of the antenna.

According to an embodiment, the communication circuit may include at least one switching circuit (e.g., a switch 517 of FIG. 5B, a switch 631 of FIGS. 6A, 6B, 6C, and 6D, or a switching circuit 730 of FIG. 7) configured to electrically connect or block the antenna with or from the UWB module or the Wi-Fi module.

According to an embodiment, the instructions may cause the processor to perform the ultra wide band (UWB) communication, when receiving UWB communication-related information through the UWB module.

According to an embodiment, the UWB communication-related information may include UWB ranging period-related information.

Figure 8:
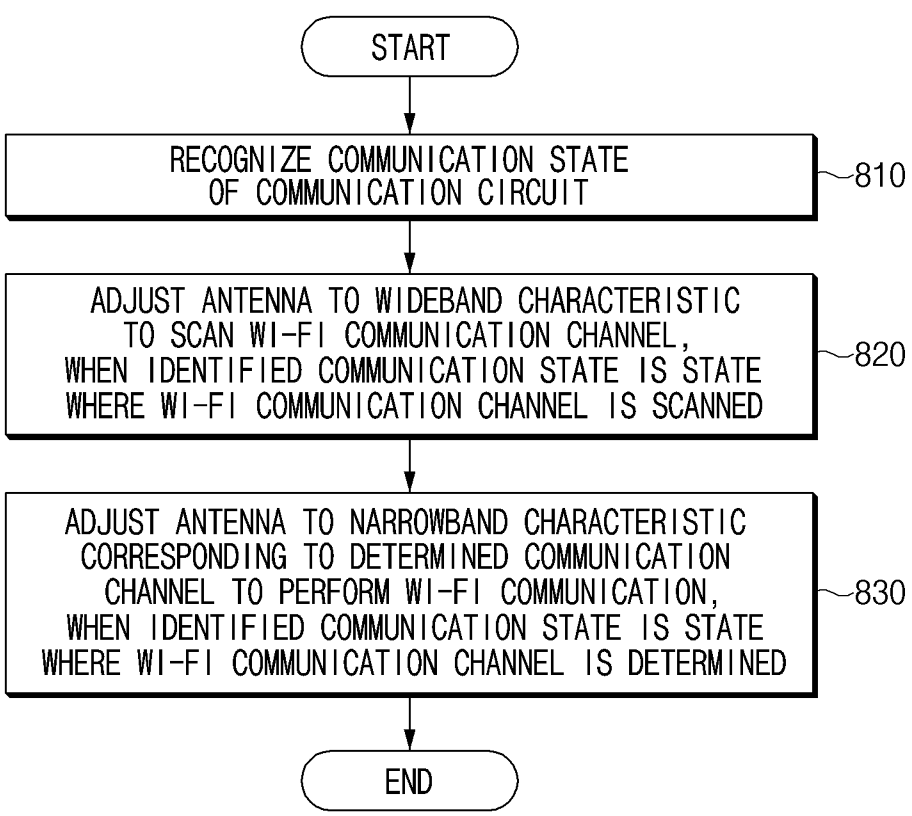
FIG. 8 is a flowchart of an antenna control method of an electronic device according to an embodiment of the disclosure.

FIG. 8 is a flowchart of an antenna control method of an electronic device according to an embodiment of the disclosure.

Referring to FIG. 8, in operation 810, an electronic device (e.g., an electronic device 101 of FIG. 1, an electronic device 200 of FIG. 2, an electronic device 500 of FIG. 5B, or an electronic device 700 of FIG. 7) may recognize a communication state of a communication circuit (e.g., a communication module 190 of FIG. 1 or a communication circuit 210 of FIG. 2). For example, the electronic device may recognize a connection state of a communication channel. For example, the electronic device may recognize whether the identified communication state is a state where a Wi-Fi communication channel is scanned or a state where the Wi-Fi communication channel is determined. For example, the electronic device may receive a signal from an external electronic device (e.g., an access point (AP)) through the communication circuit (e.g., the communication module 190 of FIG. 1 or the communication circuit 210 of FIG. 2) and may recognize the connection state of the communication channel based on the received signal. According to an embodiment, the state where the communication channel is scanned may include at least one of a communication channel scan state for searching for at least one external electronic device (e.g., an AP) to perform Wi-Fi communication, a channel scan state for changing a communication channel with the communicatively connected external electronic device, a communication channel scan state for indoor positioning of the electronic device, or a communication channel scan state for roaming settings of the electronic device. For example, the electronic device may receive signal intensity and/or location information of the external electronic device (e.g., the AP) which is present around the electronic device based on a specified time or a specified condition for indoor positioning. According to an embodiment, the specified condition may include GPS signal intensity, a specified location, a specified time period, and/or a change in value of at least one sensor included in the electronic device. For example, the electronic device may include may perform an operation similar to an operation of scanning the external electronic device to substantially determine a Wi-Fi communication channel for indoor positioning. For example, the electronic device may receive information about the surrounding external electronic device for roaming settings and may perform an operation similar to an operation of scanning the external electronic device to substantially determine a Wi-Fi communication channel According to an embodiment, when a communication situation deteriorates (e.g., when communication quality decreases to a specified level or less) while the electronic device performs Wi-Fi communication with the specific external electronic device (e.g., the access point), the electronic device may switch to a communication channel scan state for searching for a new external electronic device (e.g., a new access point).

According to an embodiment, in operation 820, when the identified communication state is the state where the Wi-Fi communication channel is scanned, the electronic device may adjust a characteristic of an antenna (e.g., an antenna 211 of FIG. 2) to a wideband characteristic to scan the Wi-Fi communication channel. In an embodiment, the electronic device may adjust the characteristic of the antenna such that the antenna operates in a band including a first Wi-Fi band and a second Wi-Fi band. For example, the first Wi-Fi band may include a 5 GHz Wi-Fi band, and the second Wi-Fi band may include a 6 GHz Wi-Fi band. According to an embodiment, the electronic device may adjust the characteristic of the antenna using a variable circuit (e.g., a variable circuit 5171, 5173, or 5175 of FIG. 5B) connected with the antenna. For example, the variable circuit may include at least one switch and lumped elements. For example, the electronic device may control the switch to electrically connect or block at least one element (e.g., a capacitor, an inductor, and/or a stub) with or from the antenna and may adjust the characteristic of the antenna. For example, the electronic device may change a pattern of the antenna (e.g., a length of the antenna) to adjust a bandwidth of the antenna to a bandwidth including the first Wi-Fi band and the second Wi-Fi band. For another example, the electronic device may adjust the characteristic of the antenna (e.g., a gain of the antenna and/or an operating frequency of the antenna) such that an operating frequency range of the antenna includes the first Wi-Fi band and the second Wi-Fi band. According to an embodiment, the electronic device may scan a communication channel in the entire range including the 5 GHz Wi-Fi band and the 6 GHz Wi-Fi band using the antenna having a wideband characteristic. For example, the electronic device may set an antenna gain to only a degree necessary to scan a communication channel and may increase an operating frequency band of the antenna to scan a communication channel in a wide band, thus reducing power and time consumed to scan the communication channel According to an embodiment, the antenna gain used to scan the communication channel may be lower than an antenna gain of the state where the communication channel is determined.

According to an embodiment, the electronic device may provide the result of scanning the communication channel. For example, the electronic device may determine a specific communication channel (e.g., a communication channel corresponding to a specific Wi-Fi AP) among communication channels scanned based on a user input and/or a bandwidth. For example, the electronic device may determine a communication channel and/or a bandwidth to communicate based on a predetermined algorithm, when performing roaming and handover. For example, the electronic device may deliver the scan result (e.g., a list of all the scanned Wi-Fi APs) to a framework layer. For example, the framework layer may determine an AP having the highest roaming score based on an algorithm of calculating a roaming score. For example, the electronic device may determine a communication channel corresponding to the AP having the highest roaming score. For example, the electronic device may determine a communication channel based on AP channel information and bandwidth information included in a signal (e.g., a beacon signal or a probe response signal) received when scanning the communication channel.

According to an embodiment, in operation 830, when the identified communication state is the state where the Wi-Fi communication channel is determined, the electronic device may adjust the characteristic of the antenna to a narrowband characteristic to perform Wi-Fi communication. For example, when the communication channel is determined, the electronic device may perform Wi-Fi communication with the specific external electronic device (e.g., the AP) over the determined communication channel. For example, the electronic device may adjust the characteristic of the antenna such that the antenna operates in a band corresponding to the determined communication channel. For example, the electronic device may adjust the characteristic of the antenna to a narrowband of a specified band for smooth communication in the determined communication channel and may increase a gain of the antenna in the specified band. For example, the electronic device may perform Wi-Fi communication with the specified external electronic device over the determined communication channel using the antenna having a narrowband characteristic. According to an embodiment, when determining the communication channel to the specific external electronic device (e.g., the AP), the electronic device may perform communication with the corresponding external electronic device through the antenna.

Figure 9:
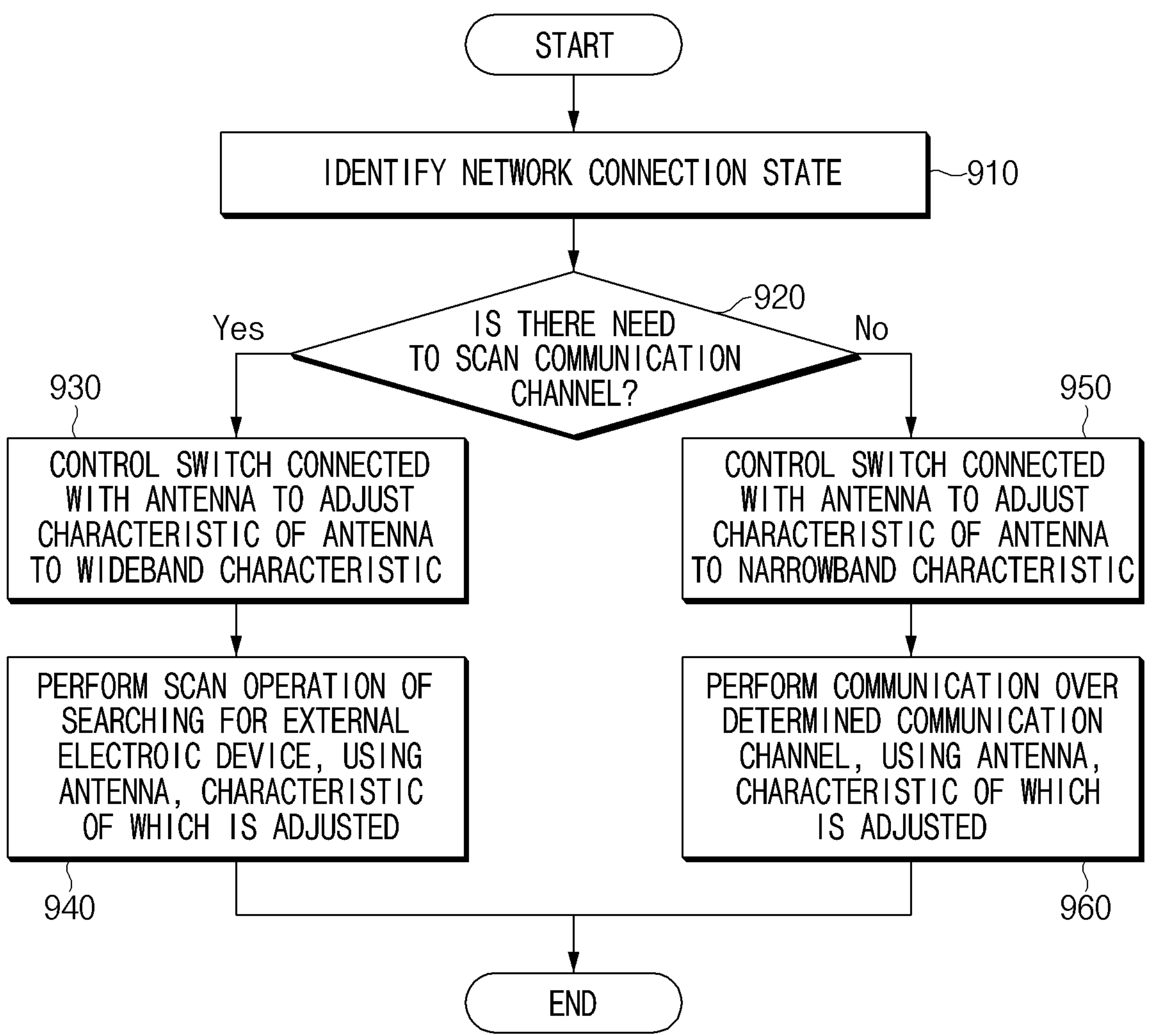
FIG. 9 is a flowchart of an antenna control method of an electronic device according to an embodiment of the disclosure.

FIG. 9 is a flowchart of an antenna control method of an electronic device according to an embodiment of the disclosure.

Hereinafter, operations which are the same as or similar to those described in FIG. 8 will be omitted in description or will be briefly described.

According to an embodiment, in operation 910, an electronic device (e.g., an electronic device 101 of FIG. 1, an electronic device 200 of FIG. 2, an electronic device 500 of FIG. 5B, or an electronic device 700 of FIG. 7) may identify a network connection state. For example, the electronic device may identify a network connection state of a communication circuit (e.g., a communication module 190 of FIG. 1 or a communication circuit 210 of FIG. 2). For another example, the electronic device may obtain information associated with a Wi-Fi network from an external electronic device. For example, the information associated with the Wi-Fi network may include Wi-Fi operation state information.

According to an embodiment, in operation 920, the electronic device may determine whether there is a need to scan a communication channel. For example, the electronic device may identify whether the identified network connection state is a state where a communication channel is scanned or a state where it communicates over the determined communication channel According to an embodiment, the state where the communication channel is scanned may include at least one of a communication channel scan state for searching for at least one external electronic device (e.g., an AP) to perform Wi-Fi communication, a communication channel scan state for indoor positioning of the electronic device, or a communication channel scan state for roaming settings of the electronic device. For example, the electronic device may determine the case where there is a need to scan a communication channel for searching for a surrounding access point (AP) to access in a state where it does not access the AP for Wi-Fi communication, the case where communication quality deteriorates in a state where it accesses the AP, the case where there is a need to scan a communication channel to change the currently accessed AP to another AP, the case where there is a need to scan a communication channel for roaming or handover, and/or the case where there is a need to scan a communication channel to obtain SSID information from surrounding APs and identify a current location of the electronic device as a state where it is required to scan a communication channel.

According to an embodiment, the electronic device may perform operation 930, when there is a need to scan a communication channel, and may perform operation 950, when there is no need to scan a communication channel (e.g., in a state whether the communication channel is determined).

According to an embodiment, in operation 930, the electronic device may control a switch connected with an antenna to adjust a characteristic of the antenna to a wideband characteristic. In an embodiment, the electronic device may adjust the characteristic of the antenna such that the antenna operates in a band including a first Wi-Fi band and a second Wi-Fi band. For example, the first Wi-Fi band may include a 5 GHz Wi-Fi band, and the second Wi-Fi band may include a 6 GHz Wi-Fi band.

According to an embodiment, in operation 940, the electronic device may perform a scan operation of searching for an external electronic device, using the antenna, the characteristic of which is adjusted. According to an embodiment, the electronic device may scan a communication channel in the entire range including the 5 GHz Wi-Fi band and the 6 GHz Wi-Fi band using the antenna having the wideband characteristic. According to an embodiment, the electronic device may determine a communication channel to communicate with the external electronic device based at least in part on the result of scanning the communication channel.

According to an embodiment, in operation 950, the electronic device may control the switch connected with the antenna to adjust the characteristic of the antenna to a narrowband characteristic. For example, the electronic device may adjust the characteristic of the antenna such that the antenna operates in a band corresponding to the determined communication channel According to an embodiment, the electronic device may adjust the characteristic of the antenna to correspond to a channel of a specific external electronic device (e.g., an AP). For another example, while performing communication with the specific external electronic device based on the narrowband characteristic of the antenna, the electronic device may maintain the characteristic of the antenna.

According to an embodiment, in operation 960, the electronic device may perform communication over the determined communication channel, using the antenna, the characteristic of which is adjusted. For example, the electronic device may perform Wi-Fi communication with the specified external electronic device (e.g., the AP) over the determined communication channel using the antenna having the narrowband characteristic.

Figure 10:
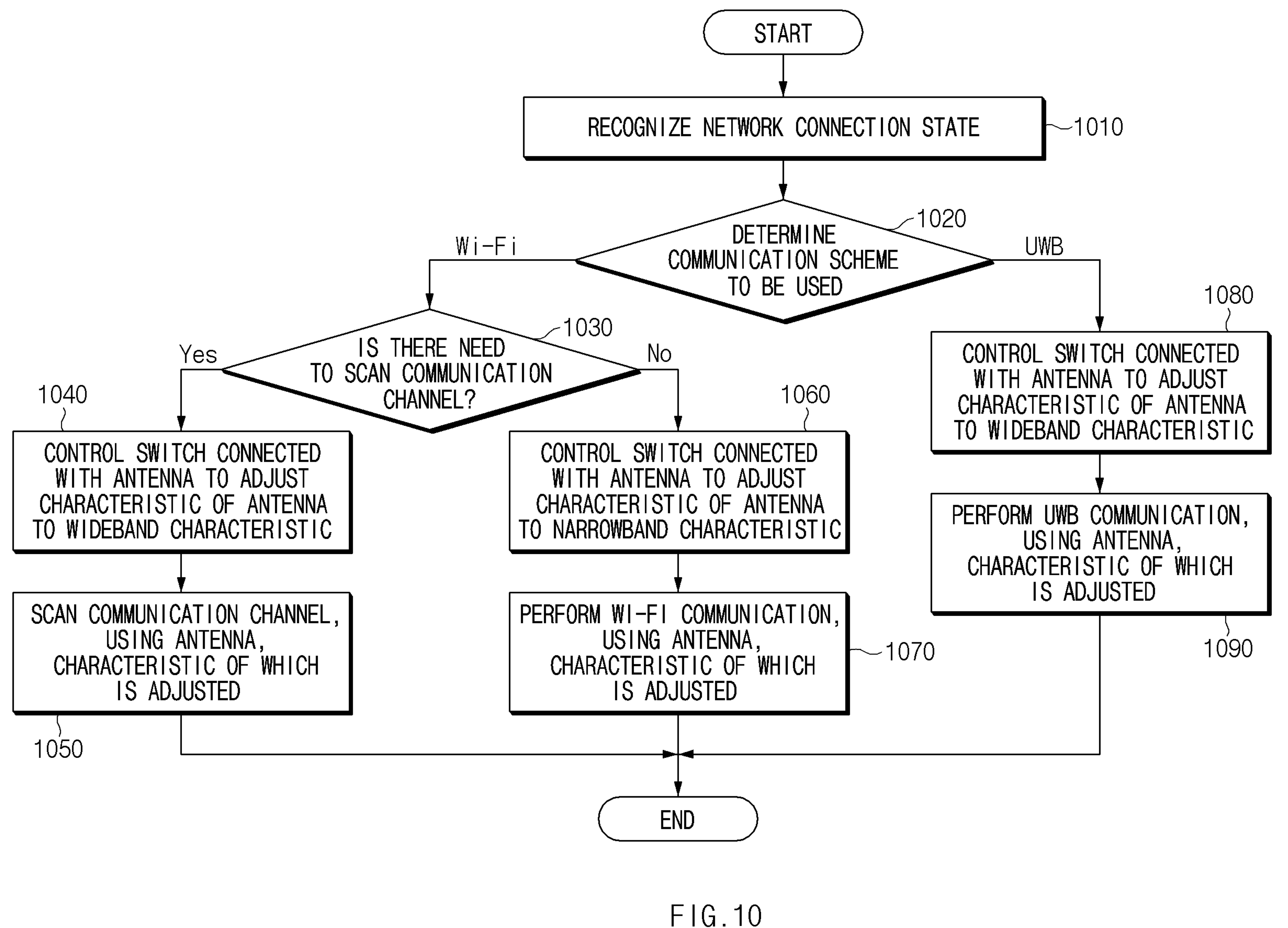
FIG. 10 is a flowchart of an antenna control method of an electronic device according to an embodiment of the disclosure.

FIG. 10 is a flowchart of an antenna control method of an electronic device according to an embodiment of the disclosure.

Hereinafter, operations which are the same as or similar to those described in FIGS. 8 and 9 will be omitted in description or will be briefly described.

According to an embodiment, in operation 1010, an electronic device (e.g., an electronic device 101 of FIG. 1, an electronic device 200 of FIG. 2, an electronic device 500 of FIG. 5B, or an electronic device 700 of FIG. 7) may recognize a network connection state. For example, the electronic device may recognize a communication scheme (e.g., Wi-Fi) which is currently in use and a communication state (e.g., a communication channel or communication quality).

According to an embodiment, in operation 1020, the electronic device may determine a communication scheme to be used. According to an embodiment, the electronic device may receive ultra wide band (UWB) communication-related information while performing Wi-Fi communication. For example, the UWB communication-related information may include UWB ranging period-related information. For example, the band of UWB communication may be at least partially common with a Wi-Fi communication band (e.g., a 5 GHz band and/or a 6 GHz band). According to an embodiment, the electronic device may receive the UWB communication-related information through Bluetooth communication (e.g., Bluetooth low energy (BLE)). According to an embodiment, the electronic device may determine to use UWB communication based on the received UWB communication-related information. According to an embodiment, the electronic device may perform operation 1030, when using the Wi-Fi communication, and may perform operation 1080, when using the UWB communication.

According to an embodiment, in operation 1030, the electronic device may determine whether there is a need to scan a communication channel. For example, the electronic device may determine whether there is a need to scan at least one external electronic device to perform the Wi-Fi communication, whether there is a need to scan a communication channel for indoor positioning, or whether there is a need to scan a communication channel for roaming settings. According to an embodiment, the electronic device may perform operation 1040, when there is a need to scan a communication channel, and may perform operation 1060, when there is no need to scan a communication channel (e.g., when the communication channel is determined (fixed)).

According to an embodiment, in operation 1040, the electronic device may control a switch connected with an antenna to adjust a characteristic of the antenna to a wideband characteristic. For example, the electronic device may adjust the characteristic of the antenna to the wideband characteristic including a first Wi-Fi band (e.g., a 5 GHz Wi-Fi band) and a second Wi-Fi band (e.g., a 6 GHz Wi-Fi band).

According to an embodiment, in operation 1050, the electronic device may scan a communication channel using the antenna, the characteristic of which is adjusted. According to an embodiment, the electronic device may scan an external electronic device (e.g., an access point) to perform the Wi-Fi communication.

According to an embodiment, in operation 1060, the electronic device may control the switch connected with the antenna to adjust the characteristic of the antenna to a narrowband characteristic. For example, in the state where the communication channel is determined (fixed), the electronic device may adjust the characteristic of the antenna to correspond to only the corresponding communication channel. For example, the electronic device may adjust the characteristic of the antenna to have a bandwidth (e.g., 20 MHz, 40 MHz, 80 MHz, or 1600 MHz) used for the Wi-Fi communication at a frequency corresponding to the communication channel.

According to an embodiment, in operation 1070, the electronic device may perform the Wi-Fi communication using the antenna, the characteristic of which is adjusted. According to an embodiment, the electronic device may perform the Wi-Fi communication with a specific external electronic device (e.g., a specific AP).

According to an embodiment, in operation 1080, the electronic device may control the switch connected with the antenna to adjust the characteristic of the antenna to a wideband characteristic. For example, the electronic device may adjust the characteristic of the antenna such that the antenna operates in a band including at least a portion (e.g., the 5 GHz band and/or the 6 GHz band) of the UWB communication band. For example, the electronic device may adjust the characteristic of the antenna to have a 500 MHz to 1.3 GHz bandwidth in at least a portion of the UWB communication band. According to an embodiment, the electronic device 200 may adjust the characteristic of the antenna to the wideband characteristic to correspond to at least a portion of the UWB communication band, depending on a specified period based on the UWB communication-related information (e.g., the UWB ranging period-related information).

According to an embodiment, in operation 1090, the electronic device may perform the UWB communication using the antenna, the characteristic of which is adjusted.

According to an embodiment, the electronic device may adaptively adjust the characteristic of the antenna based on the communication scheme and/or the communication state, thus performing communication in the form of being suitable for the communication scheme and/or communication state using the one antenna. For example, the electronic device may adaptively adjust the characteristic of the antenna based on the communication scheme and/or the communication state of the antenna, thus reducing power and time consumed unnecessarily when scanning a communication channel.

Figure 11:
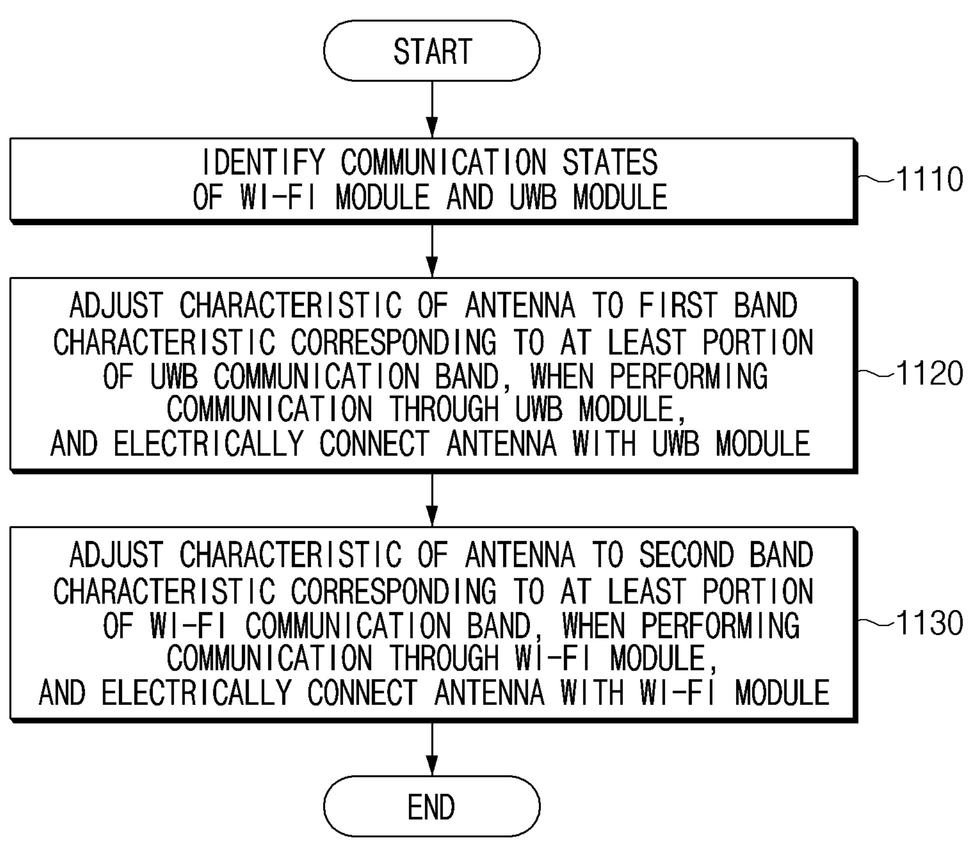
FIG. 11 is a flowchart of an antenna control method of an electronic device according to an embodiment of the disclosure.

FIG. 11 is a flowchart of an antenna control method of an electronic device according to an embodiment of the disclosure.

According to an embodiment, in operation 1110, an electronic device (e.g., an electronic device 101 of FIG. 1, an electronic device 200 of FIG. 2, an electronic device 500 of FIG. 5B, or an electronic device 700 of FIG. 7) may identify communication states of a Wi-Fi module (e.g., a Wi-Fi module 710 of FIG. 7) and a UWB module (e.g., a UWB module 720 of FIG. 7). For example, the electronic device may identify whether it is performing Wi-Fi communication through the Wi-Fi module or whether it is performing UWB communication through the UWB module. For example, the electronic device may determine whether to change a communication scheme which is being currently performed (e.g., whether to switch from Wi-Fi communication to UWB communication or switch from UWB communication to Wi-Fi communication). According to an embodiment, the electronic device may include a communication circuit including the Wi-Fi module and the UWB module. For example, the electronic device may receive a signal from an external electronic device through the Wi-Fi module and/or the UWB module. For example, the signal received from the external electronic device may include information associated with the Wi-Fi communication or information associated with the UWB communication. For example, a processor of the electronic device may identify a communication state based on the information received from the Wi-Fi module and/or the UWB module (e.g., state information and/or operation-related information of the Wi-Fi module and/or the UWB module). For example, when receiving the information associated with the UWB communication (e.g., UWB ranging period information), which is received from the UWB module, while performing the Wi-Fi communication, the processor may at least temporarily stop the Wi-Fi communication and may perform the UWB communication.

According to an embodiment, in operation 1120, the electronic device may adjust a characteristic of an antenna to a first band characteristic corresponding to at least a portion of the UWB communication band, when performing communication through the UWB module, and may electrically connect the antenna with the UWB module. For example, the band supported in the Wi-Fi communication may include a 2.4 GHz band, a 5 GHz band, and a 6 GHz band, and the band supported in the UWB communication may be a 5 GHz to 8 GHz band. According to an embodiment, the electronic device may support some bands (e.g., the 5 GHz and 6 GHz bands) in common in the Wi-Fi communication and the UWB communication. For example, the electronic device may use the at least one antenna for both the Wi-Fi communication and the UWB communication. According to an embodiment, the electronic device may selectively connect the at least one antenna with one of the UWB module and the Wi-Fi module by means of a switching circuit. For example, there may be a need for the antenna to have different antenna characteristics when performing the Wi-Fi communication and the UWB communication. For example, there is a need for the antenna to have a relative narrowband characteristic during the Wi-Fi communication and have a relative wideband characteristic during the UWB communication. According to an embodiment, the electronic device may adjust the characteristic of the antenna to a characteristic corresponding to a communication scheme to be performed, based on the communication scheme to be performed. For example, the electronic device may adjust the at least one antenna to a first band corresponding to at least a portion of the UWB communication band and may connect the at least one antenna with the UWB module, while performing the UWB communication, thus performing communication through the UWB module.

According to an embodiment, in operation 1130, the electronic device may adjust the characteristic of the antenna to a second band characteristic corresponding to at least a portion of the Wi-Fi communication band, when performing communication through the Wi-Fi communication module, and may electrically connect the antenna with the Wi-Fi module. For example, the electronic device may adjust the at least one antenna to a second band corresponding to at least a portion of the Wi-Fi communication band and may connect the at least one antenna with the Wi-Fi module, while performing the Wi-Fi communication, thus performing communication through the Wi-Fi module.

According to an embodiment, an antenna control method of an electronic device may include identifying a communication state of a communication circuit of the electronic device; adjusting a characteristic of an antenna included in the communication circuit to a wideband characteristic including a first wireless-fidelity (Wi-Fi) band and a second Wi-Fi band by means of the communication circuit to scan a Wi-Fi communication channel, when the identified communication state is a state where the Wi-Fi communication channel is scanned; determining a communication channel to perform communication based on a result of the scan; and adjusting the characteristic of the antenna to a narrowband characteristic corresponding to the determined communication channel by means of the communication circuit.

According to an embodiment, the first Wi-Fi band may include a 5 GHz Wi-Fi band, and the second Wi-Fi band may include a 6 GHz Wi-Fi band.

According to an embodiment, the method may further include adjusting the characteristic of the antenna using at least one variable circuit included in the communication circuit.

According to an embodiment, the at least one variable circuit may include at least one switch and lumped components. The method may further include controlling the at least one switch to adjust the characteristic of the antenna.

According to an embodiment, the state where the Wi-Fi communication channel is scanned may include at least one of a communication channel scan state for searching for at least one external electronic device to perform Wi-Fi communication, a communication channel scan state for indoor positioning of the electronic device, or a communication channel scan state for roaming settings.

According to an embodiment, the method may further include adjusting the characteristic of the antenna to a wideband characteristic including an ultra wide band (UWB) band, when receiving UWB communication-related information through the communication circuit.

According to an embodiment, the UWB communication-related information may include UWB ranging period-related information.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium. For example, the non-transitory storage medium may include a buffer in which the data is temporally stored.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product (e.g., a downloadable app) may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a communication circuit comprising at least one antenna;

memory storing instructions; and at least one processor operatively connected with the communication circuit and the memory, wherein the instructions, when executed by the at least one processor individually or collectively, cause the electronic device to:

identify whether a communication state of the communication circuit corresponds to a state in which a wireless-fidelity (Wi-Fi) communication channel to perform Wi-Fi communication is determined, when the communication state corresponds to a state in which the Wi-Fi communication channel to perform the Wi-Fi communication is not determined, adjust a characteristic of the at least one antenna to a wideband characteristic covering a first Wi-Fi band and a second Wi-Fi band to scan at least one Wi-Fi communication channel, and when the communication state corresponds to the state in which the Wi-Fi communication channel to perform the Wi-Fi communication is determined, adjust the characteristic of the at least one antenna to a narrowband characteristic corresponding to the determined Wi-Fi communication channel to perform the Wi-Fi communication, wherein the determined Wi-Fi communication channel is included in one of the first Wi-Fi band and the second Wi-Fi band, wherein the first Wi-Fi band includes a 5 gigahertz (GHz) Wi-Fi band and the second Wi-Fi band includes a 6 GHz Wi-Fi band, wherein the adjusting of the characteristic of the at least one antenna includes a change in antenna gain of the at least one antenna for at least one portion of one or more frequency bands, and wherein the antenna gain, in the 5 GHz Wi-Fi band and the 6 GHz Wi-Fi band, of the at least one antenna adjusted for the wideband characteristic is lower than the antenna gain, in the determined Wi-Fi communication channel included in one of the 5 GHz Wi-Fi band and the 6 GHz Wi-Fi band, of the at least one antenna adjusted for the narrowband characteristic.

2. The electronic device of claim 1, wherein the instructions, when executed by the at least one processor individually or collectively, further cause the electronic device to:

scan the at least one Wi-Fi communication channel, and determine the Wi-Fi communication channel to perform the Wi-Fi communication based on a result of the scan of the at least one Wi-Fi communication channel.

3. The electronic device of claim 1, wherein the communication circuit comprises at least one variable circuit configured to adjust the characteristic of the at least one antenna.

4. The electronic device of claim 3, wherein the at least one variable circuit comprises at least one switch and lumped components, and wherein the instructions, when executed by the at least one processor individually or collectively, further cause the electronic device to:

control the at least one switch to adjust the characteristic of the at least one antenna.

5. The electronic device of claim 1, wherein the state in which the Wi-Fi communication channel to perform the Wi-Fi communication is not determined includes a state in which the at least one Wi-Fi communication channel is scanned, and wherein the state in which the at least one Wi-Fi communication channel is scanned includes at least one of:

a communication channel scan state for searching for at least one external electronic device to perform the Wi-Fi communication, a communication channel scan state for indoor positioning of the electronic device, or a communication channel scan state for roaming settings.

6. The electronic device of claim 1, wherein the instructions, when executed by the at least one processor individually or collectively, further cause the electronic device to:

adjust the characteristic of the at least one antenna to a wideband characteristic covering an ultra wide band (UWB) band, when receiving UWB communication-related information through the communication circuit.

7. The electronic device of claim 6, wherein the UWB communication-related information includes UWB ranging period-related information.

8. A method for antenna control performed by an electronic device, the method comprising:

identifying whether a communication state of a communication circuit of the electronic device corresponds to a state in which a wireless-fidelity (Wi-Fi) communication channel to perform Wi-Fi communication is determined;

when the communication state corresponds to a state in which the Wi-Fi communication channel to perform the Wi-Fi communication is not determined, adjusting a characteristic of at least one antenna included in the communication circuit to a wideband characteristic covering a first Wi-Fi band and a second Wi-Fi band to scan at least one Wi-Fi communication channel; and when the communication state corresponds to the state in which the Wi-Fi communication channel to perform the Wi-Fi communication is determined, adjusting the characteristic of the at least one antenna to a narrowband characteristic corresponding to the determined Wi-Fi communication channel to perform the Wi-Fi communication, wherein the determined Wi-Fi communication channel is included in one of the first Wi-Fi band and the second Wi-Fi band, wherein the first Wi-Fi band includes a 5 gigahertz (GHz) Wi-Fi band and the second Wi-Fi band includes a 6 GHz Wi-Fi band, wherein the adjusting of the characteristic of the at least one antenna includes a change in antenna gain of the at least one antenna for at least one portion of one or more frequency bands, and wherein the antenna gain, in the 5 GHz Wi-Fi band and the 6 GHz Wi-Fi band, of the at least one antenna adjusted for the wideband characteristic is lower than the antenna gain, in the determined Wi-Fi communication channel included in one of the 5 GHz Wi-Fi band and the 6 GHz Wi-Fi band, of the at least one antenna adjusted for the narrowband characteristic.

9. The method of claim 8, further comprising:

scanning the at least one Wi-Fi communication channel; and determining the Wi-Fi communication channel to perform the Wi-Fi communication based on a result of the scanning of the at least one Wi-Fi communication channel.

10. The method of claim 8, further comprising:

adjusting the characteristic of the at least one antenna using at least one variable circuit included in the communication circuit.

11. The method of claim 10, wherein the at least one variable circuit comprises at least one switch and lumped components, and wherein the method further comprises:

controlling the at least one switch to adjust the characteristic of the at least one antenna.

12. The method of claim 8, wherein the state in which the Wi-Fi communication channel to perform the Wi-Fi communication is not determined includes a state in which the at least one Wi-Fi communication channel is scanned, and wherein the state in which the at least one Wi-Fi communication channel is scanned includes at least one of:

a communication channel scan state for searching for at least one external electronic device to perform the Wi-Fi communication, a communication channel scan state for indoor positioning of the electronic device, or a communication channel scan state for roaming settings.

13. The method of claim 8, further comprising:

adjusting the characteristic of the at least one antenna to a wideband characteristic covering an ultra wide band (UWB) band, when receiving UWB communication-related information through the communication circuit.

14. The method of claim 13, wherein the UWB communication-related information includes UWB ranging period-related information.

15. An electronic device, comprising:

a communication circuit comprising:

a wireless-fidelity (Wi-Fi) circuit, an ultra wide band (UWB) circuit, a first antenna electrically connected to the Wi-Fi circuit and having a first band characteristic corresponding to at least a portion of a Wi-Fi communication band, a second antenna electrically connected to the UWB circuit and having a second band characteristic corresponding to at least a portion of a UWB communication band, and a third antenna;

a switching circuit configured to electrically connect the third antenna to the Wi-Fi circuit or the UWB circuit;

memory storing instructions; and at least one processor operatively connected with the communication circuit, the switching circuit, and the memory, wherein the instructions, when executed by the at least one processor individually or collectively, cause the electronic device to:

identify communication states of the Wi-Fi circuit and the UWB circuit, when performing communication using the UWB circuit, adjust a characteristic of the third antenna to a third band characteristic corresponding to another portion of the UWB communication band, and electrically connect the third antenna to the UWB circuit via the switching circuit, and when performing communication using the Wi-Fi circuit, adjust the characteristic of the third antenna to a fourth band characteristic corresponding to another portion of the Wi-Fi communication band, and electrically connect the third antenna to the Wi-Fi circuit via the switching circuit, wherein communication through the UWB circuit has a higher priority than communication through the Wi-Fi circuit, and wherein the adjusting of the characteristic of the third antenna includes a change in antenna gain of the third antenna for at least one portion of one or more frequency bands.

16. The electronic device of claim 15, wherein the other portion of the UWB communication band and the other portion of the Wi-Fi communication band include at least one of a 5 gigahertz (GHz) communication band or a 6 GHz communication band.

17. The electronic device of claim 15, wherein the communication circuit further comprises a variable circuit configured to adjust the characteristic of the third antenna.

18. The electronic device of claim 17, wherein the variable circuit comprises a plurality of lumped elements and at least one switching circuit configured to:

electrically connect or disconnect each of the plurality of lumped elements to and from the third antenna.

19. The electronic device of claim 15, wherein the instructions, when executed by the at least one processor individually or collectively, further cause the electronic device to:

perform UWB communication, when receiving UWB communication-related information through the UWB circuit.

20. The electronic device of claim 19, wherein the UWB communication-related information includes UWB ranging period-related information.

* * * * *